(12) United States Patent
Miller et al.

(10) Patent No.: US 9,668,530 B2
(45) Date of Patent: Jun. 6, 2017

(54) RESILIENT PROMINENCE FABRIC AND ARTICLES MADE THEREFROM

(71) Applicant: Stephen D. Miller, Flagstaff, AZ (US)

(72) Inventors: Stephen D Miller, Flagstaff, AZ (US); Ronald D Montgomery, Kula, HI (US)

(*) Notice: Subject to any disclaimer, the term of this patent is extended or adjusted under 35 U.S.C. 154(b) by 0 days.

(21) Appl. No.: 14/764,269

(22) PCT Filed: Jan. 30, 2014

(86) PCT No.: PCT/US2014/013745
§ 371 (c)(1),
(2) Date: Jul. 29, 2015

(87) PCT Pub. No.: WO2014/120867
PCT Pub. Date: Aug. 7, 2014

(65) Prior Publication Data
US 2015/0366281 A1    Dec. 24, 2015

Related U.S. Application Data

(60) Provisional application No. 61/758,279, filed on Jan. 30, 2013.

(51) Int. Cl.
*A41D 31/02* (2006.01)
*B32B 3/24* (2006.01)
(Continued)

(52) U.S. Cl.
CPC ...... *A41D 31/0011* (2013.01); *A41D 31/0016* (2013.01); *A41D 31/0038* (2013.01);
(Continued)

(58) Field of Classification Search
None
See application file for complete search history.

(56) References Cited

U.S. PATENT DOCUMENTS 2,607,104 A * 8/1952 Foster ............... A41D 31/0011
139/384 R
2,851,390 A * 9/1958 Chavannes ........ A41D 31/0016
156/252
(Continued)

FOREIGN PATENT DOCUMENTS

CA   2218282 A1 * 6/1999 ......... A41D 31/0038
EP   825018 A2 * 2/1998
(Continued)

OTHER PUBLICATIONS

Machine Translation of EP 825018 A2, Feb. 1998.*

*Primary Examiner* — Jeff Vonch
(74) *Attorney, Agent, or Firm* — Invention To Patent Services; Alex Hobson

(57) ABSTRACT

A fabric having resilient prominences on at least one surface is described for improved thermal protection, drag reduction and quick drying. Resilient prominences are bulges that extend outward from a fabric surface and trap some volume of air or other material therein. For example, a resilient prominence may be dome shaped and extend outward from the fabric plane. A resilient prominence is resilient in shape, whereby the resilient prominence may be compressed and then popped back into substantially the original shape. Reflective and/or absorptive materials may be configured on the surface of the fabric to provide camouflage from IR cameras. Reflective material may be configured on the fabric to reflect heat back to the wearer of a garment made with the fabric described.

20 Claims, 18 Drawing Sheets

(51) Int. Cl.

| | | |
|---|---|---|
| *B32B 3/28* | (2006.01) | |
| *B32B 3/30* | (2006.01) | |
| *B32B 5/02* | (2006.01) | |
| *B32B 5/26* | (2006.01) | |
| *B32B 15/14* | (2006.01) | |
| *B32B 27/14* | (2006.01) | |
| *A41D 31/00* | (2006.01) | |
| *B32B 27/12* | (2006.01) | |
| *B32B 3/26* | (2006.01) | |
| *D06N 7/00* | (2006.01) | |
| *D06N 3/00* | (2006.01) | |
| *A43B 3/16* | (2006.01) | |
| *A43B 5/06* | (2006.01) | |
| *A43B 5/18* | (2006.01) | |
| *A43B 7/34* | (2006.01) | |
| *A43B 23/02* | (2006.01) | |
| *B32B 5/04* | (2006.01) | |
| *B32B 5/06* | (2006.01) | |

(52) U.S. Cl.
CPC ........... *A43B 3/163* (2013.01); *A43B 5/06* (2013.01); *A43B 5/18* (2013.01); *A43B 7/34* (2013.01); *A43B 23/0245* (2013.01); *B32B 3/266* (2013.01); *B32B 3/28* (2013.01); *B32B 3/30* (2013.01); *B32B 5/022* (2013.01); *B32B 5/024* (2013.01); *B32B 5/026* (2013.01); *B32B 5/26* (2013.01); *B32B 27/12* (2013.01); *D06N 3/0077* (2013.01); *D06N 7/0092* (2013.01); *A41D 2400/10* (2013.01); *A41D 2400/20* (2013.01); *A41D 2500/20* (2013.01); *A41D 2500/30* (2013.01); *A41D 2500/50* (2013.01); *A41D 2600/10* (2013.01); *A41D 2600/102* (2013.01); *B32B 5/04* (2013.01); *B32B 5/06* (2013.01); *B32B 15/14* (2013.01); *B32B 2255/02* (2013.01); *B32B 2255/205* (2013.01); *B32B 2307/304* (2013.01); *B32B 2307/416* (2013.01); *B32B 2307/51* (2013.01); *B32B 2307/724* (2013.01); *B32B 2307/73* (2013.01); *B32B 2437/00* (2013.01); *D06N 2205/04* (2013.01); *D06N 2209/065* (2013.01); *D06N 2209/123* (2013.01); *D06N 2211/10* (2013.01); *Y10S 428/909* (2013.01); *Y10T 428/24273* (2015.01); *Y10T 428/24281* (2015.01); *Y10T 428/24298* (2015.01); *Y10T 428/24314* (2015.01); *Y10T 428/24322* (2015.01); *Y10T 428/24612* (2015.01); *Y10T 428/24636* (2015.01); *Y10T 428/24661* (2015.01); *Y10T 442/3008* (2015.04); *Y10T 442/3382* (2015.04); *Y10T 442/3398* (2015.04); *Y10T 442/3463* (2015.04); *Y10T 442/3854* (2015.04); *Y10T 442/601* (2015.04); *Y10T 442/654* (2015.04); *Y10T 442/657* (2015.04); *Y10T 442/674* (2015.04)

(56) References Cited

U.S. PATENT DOCUMENTS

| | | | | |
|---|---|---|---|---|
| 3,219,514 | A * | 11/1965 | Roysanc | A41D 31/0038 156/210 |
| 3,231,454 | A * | 1/1966 | Williams | B65D 81/03 206/521 |
| 3,444,035 | A * | 5/1969 | Bushnell | B32B 27/00 156/176 |
| 3,577,305 | A * | 5/1971 | Engle | A41D 13/0155 2/243.1 |
| 3,619,340 | A * | 11/1971 | Jones | E04B 1/806 428/116 |
| 3,707,433 | A * | 12/1972 | Clough | B29C 44/12 428/137 |
| 4,032,681 | A * | 6/1977 | Jonnes | A41D 31/0016 156/212 |
| 4,136,222 | A * | 1/1979 | Jonnes | B29D 24/005 2/243.1 |
| 4,401,706 | A * | 8/1983 | Sovilla | B32B 3/28 156/210 |
| 4,420,521 | A * | 12/1983 | Carr | A41D 31/02 2/272 |
| 4,465,731 | A * | 8/1984 | Pusch | F41H 3/02 428/174 |
| 4,467,005 | A * | 8/1984 | Pusch | B32B 5/26 2/900 |
| 4,569,874 | A * | 2/1986 | Kuznetz | A41D 31/0038 2/272 |
| 4,685,155 | A * | 8/1987 | Fingerhut | A41D 27/06 2/272 |
| 4,741,941 | A * | 5/1988 | Englebert | A47L 13/16 15/209.1 |
| 5,599,585 | A * | 2/1997 | Cohen | C23C 14/20 427/171 |
| 5,620,771 | A * | 4/1997 | Middleton | A41D 31/02 428/131 |
| 5,643,653 | A | 7/1997 | Griesbach et al. | |
| 5,731,062 | A * | 3/1998 | Kim | B29C 51/004 428/167 |
| 5,882,322 | A * | 3/1999 | Kim | A61F 5/01 428/174 |
| 5,896,680 | A * | 4/1999 | Kim | A43B 13/187 36/28 |
| 5,972,477 | A * | 10/1999 | Kim | B32B 3/28 264/257 |
| 6,263,511 | B1 * | 7/2001 | Moretti | A41D 27/28 2/410 |
| 6,295,654 | B1 * | 10/2001 | Farrell | A41D 13/0153 2/108 |
| 6,306,483 | B1 * | 10/2001 | Bessey | B29C 51/004 428/167 |
| 6,800,573 | B2 * | 10/2004 | Van De Ven | B32B 27/12 427/123 |
| 6,857,238 | B2 * | 2/2005 | Alderman | B32B 5/02 52/406.3 |
| 8,918,919 | B2 * | 12/2014 | Scholz | A41D 31/0016 2/458 |
| 2003/0203691 | A1 | 10/2003 | Fenwick et al. | |
| 2004/0224133 | A1 * | 11/2004 | Pourdeyhimi | B32B 5/02 428/180 |
| 2005/0008825 | A1 | 1/2005 | Casey et al. | |
| 2005/0075027 | A1 * | 4/2005 | Etchells | A43B 1/0045 442/205 |
| 2006/0029777 | A1 * | 2/2006 | Yanai | E04B 1/806 428/178 |
| 2006/0099431 | A1 * | 5/2006 | Scholz | A41D 31/0016 428/457 |
| 2006/0135019 | A1 * | 6/2006 | Russell | A41D 27/06 442/335 |
| 2006/0228528 | A1 * | 10/2006 | Link | A47C 31/001 428/180 |
| 2007/0293106 | A1 * | 12/2007 | Harber | A41D 1/04 442/2 |
| 2008/0260998 | A1 * | 10/2008 | Suzuki | D06M 11/83 428/164 |
| 2010/0282433 | A1 * | 11/2010 | Blackford | A41D 31/0038 165/46 |
| 2011/0041230 | A1 * | 2/2011 | Huang | A41D 31/0038 2/69 |
| 2011/0131700 | A1 * | 6/2011 | Tsui | A41D 13/0125 2/93 |
| 2011/0203028 | A1 * | 8/2011 | Orologio | A41D 31/0038 2/69 |
| 2012/0255671 | A1 | 10/2012 | Wallstabe et al. | |
| 2012/0288662 | A1 * | 11/2012 | Conolly | A43B 1/0045 428/87 |

(56) References Cited

U.S. PATENT DOCUMENTS

| | | | | |
|---|---|---|---|---|
| 2013/0189484 A1* | 7/2013 | Quenedey | ................ | B32B 3/12 |
| | | | | 428/138 |
| 2013/0216774 A1* | 8/2013 | Conolly | ............... | B32B 15/046 |
| | | | | 428/135 |
| 2015/0201683 A1* | 7/2015 | Maud | .................. | A41D 13/002 |
| | | | | 428/72 |

FOREIGN PATENT DOCUMENTS

| | | | | |
|---|---|---|---|---|
| EP | 1163485 B1 | 7/2003 | | |
| GB | 2186253 A * | 8/1987 | ............. | B65D 65/44 |
| WO | WO 9935926 A1 * | 7/1999 | ......... | A41D 31/0027 |
| WO | WO 0035996 A1 * | 6/2000 | ......... | A41D 31/0011 |

\* cited by examiner

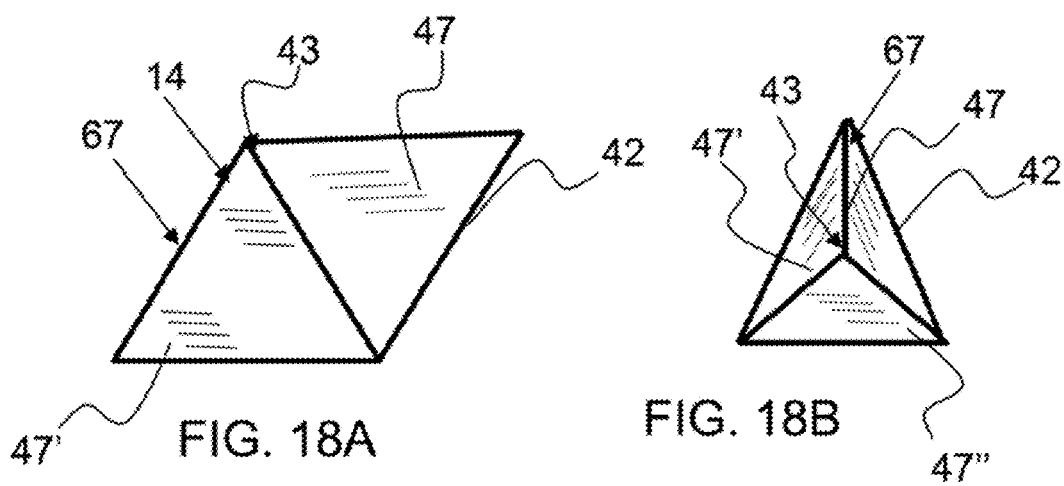
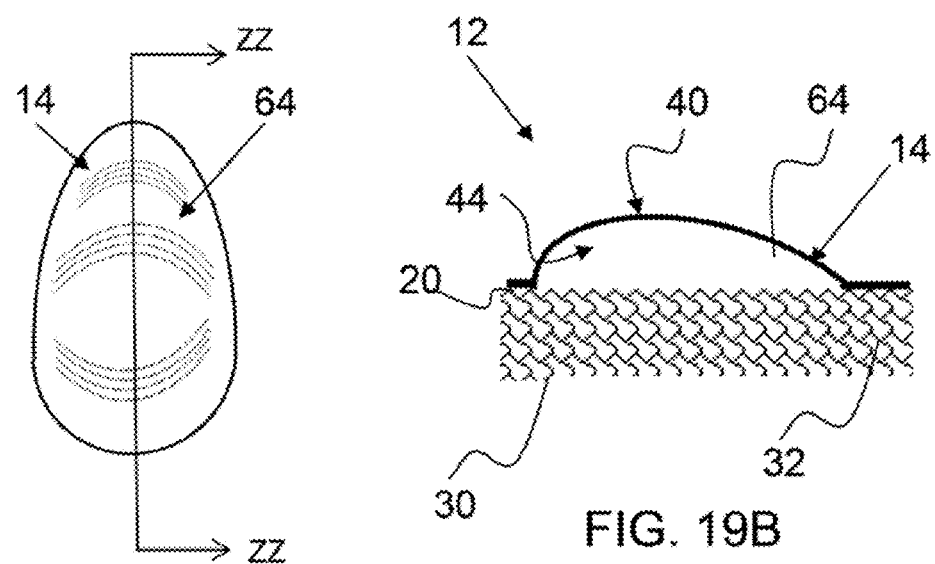

RESILIENT PROMINENCE FABRIC AND ARTICLES MADE THEREFROM

CROSS REFERENCE TO RELATED APPLICATION

This application in a national stage entry application under 35 U.S.C. 371 of PCT application no. PCT/US14/013745, filed on Jan. 30, 2014, which claims the benefit of U.S. provisional patent application No. 61/758,279, filed on Jan. 30, 2013 and entitled Resilient Prominence Fabric and Articles Made Therefrom, the entirety of which is incorporated by reference herein.

BACKGROUND OF THE INVENTION

Field of the Invention

The present invention relates to a fabric comprising resilient prominences on at least one surface of the fabric.

Background

Fabrics for cold weather comprise any number of thermal insulation materials and constructions. Many cold weather fabric constructions comprise a bat of filler material, such as down, captured between two layers for fabric. Other cold weather fabric constructions comprise synthetic foam, fibers or membranes configured to provide thermal insulation. These fillers and other materials are typically incorporated into the fabric to trap or slow the transfer of air from one surface of the fabric to the other surface. Overtime however, these fillers can bunch-up, settle within the fabric or pockets formed within the fabric or simply become compressed, reducing their effectiveness. In addition, many of the filler materials become irreversibly damaged when exposed to water. Water exposure may cause the filler materials to clump thereby reducing their volume, and air trapping benefit. Other materials, such as membranes or foams may have very low air permeability that leads to moisture being trapped within the fabric. When the fabric is used as a garment, a wearer of such fabric may become damp as trapped moisture in the garment cannot effectively be transferred.

Cold weather fabrics typically have limited moisture wicking and hydrophobic properties. Many fabrics adsorb water and become very heavy and uncomfortable when used as a garment or sleeping bag. Other cold weather fabrics comprise a hydrophobic outer layer, however if the inner layer does become wet, such as through the absorption of perspiration, the outer layer may not effectively allow the moisture to be transferred. In addition, moisture that is not allowed to escape from the insulation layers, or be removed from the skin, can rob the body of heat when activity slows down or stops, resulting in chills and more serious conditions.

Fabrics worn during high-speed sports and recreational activities can produce considerable drag, and/or discomfort to the wearer. For example, when traveling at a high rate of speed in an exposed environment, such as when riding a motorcycle or riding in a speedboat, a person's clothes can flap and create a lot of noise, air drag and discomfort. In addition, in competitive high-speed sports, such as downhill skiing, or bicycle racing, a fraction of a second can make the difference between winning and losing.

In some applications, it is desirable to have a fabric or garment that cannot be seen by thermal cameras. Many of these fabrics are designed to control emittance over specific wavelengths of interest, such as in the infrared (IR) spectrum. Viewed through an IR camera, these fabrics appear flat. Even if the IR signature is subdued, camouflaged, or intentionally matches the surroundings. In addition, fabrics have been created that reflect and/or absorb IR energy in a way that camouflages the fabric. These fabrics typically comprise a metallic coating or component that is configured in the flat fabric.

There exists a need for a fabric that has durable thermal insulation properties, whereby the thermal insulation properties are not compromised by exposure to water, or by long-term use including compression of the fabric. There also exists a need for a fabric that quickly and effectively dries when exposed to water. In addition, there is a need for a fabric that provides at least a partial barrier from wind and permits water vapor to escape during activities, thereby maintaining a microclimate within the interior of a garment that is comfortable. Furthermore, there exists a need for a fabric that effectively provides camouflage from IR imaging.

SUMMARY OF THE INVENTION

The invention is directed to a fabric comprising resilient prominences on at least one surface of the fabric. Resilient prominences are bulges that extend outward from a fabric surface and trap some volume of air therein. For example, a resilient prominence may be dome shaped and extend outward from the fabric plane. A resilient prominence is resilient in shape, whereby the resilient prominence may be compressed and then popped back into substantially the original shape. In some embodiments, a resilient prominence is a self-resilient prominence, whereby the resilient prominence returns to its original shape when a compression force is removed. A resilient prominence may be self-supporting, and maintain shape under the weight of the fabric when configured on a surface with the resilient prominences facing down. A resilient prominence may be hollow or substantially hollow, whereby the interior of the prominence is void of material. A resilient prominence may be deformable and may have any suitable resistance to deformation, including having a shore OO durometer value of no more than about 70 or more, no more than about 40, greater than about 10, greater than about 40 and any range between and including the values provided. In some embodiments, the resilient prominences may be harder and more difficult to deform and may have a shore A durometer value of no more than about 40, no more than about 25 and any range between and including the values provided.

An elastomeric material may be used in a self-resilient prominence, for example. A fabric, as described herein, may comprise apertures that allows for airflow or permeation through the fabric or portion thereof. Apertures may be selectively configured in the resilient prominences or in a specific location of the resilient prominences and may be any suitable shape or dimension. The fabric, as described herein may be used for any suitable purpose, including, but not limited to, garments including pants, shirts, jackets, specialized clothing including ski suits, sailing apparel, hang-gliding apparel, motorcycle apparel, snowmobile apparel, survival gear, and protective apparel, helmet or shoe covers, sleeping bags, tents, portable enclosures, blankets, vehicle panels or covers, sails and the like.

The resilient prominences, as described herein comprise a raised portion of material from the plane of the fabric, wherein an interior volume is formed. A resilient prominence may be a discrete resilient prominence, whereby the troughs around the resilient prominence all intersect with the plane of the fabric. The plane of the fabric is the general surface of the fabric interposed between the resilient prominences, or network between the prominences. For example, a discrete resilient prominence may be a dome type and the perimeter of the generally dome shape may couple with the plane of the fabric around the entire perimeter of the dome. In another embodiment however, a plurality of dome type resilient prominences may be configured on a fabric and their perimeters may intersect with one another, whereby the plane of the fabric is not readily discernable and must be approximated from the general contour the fabric and the troughs around the resilient prominences. The resilient prominence surface of the fabric may have a continuous undulation created by a plurality of resilient prominence intersections each other. When resilient prominences have perimeters the intersect with one another, they are referred to as continuous resilient prominences.

A dome type resilient prominence may have a true dome shape with curved surfaces that ascend to an apex, or a dome type may have a pyramid shape, with flat surfaces that lead to apex or any other suitable shape. In one embodiment, a dame type resilient prominence has curved surfaces that extend from a square shaped perimeter.

In an exemplary embodiment, a resilient prominence has an apex and troughs on at least two sides. For example, a resilient prominence may have a dome shape, wherein a dome shaped portion of fabric has an apex at the top of the dome and troughs configured around the dome. The apex of a resilient prominence may be any suitable height including, but not limited to, 0.050 inch or more, 0.125 inch or more, 0.25 inch or more, 0.375 inch or more, 0.50 inch or more, 0.625 inch or more, 0.75 inch or more, and any range between and including the apex heights provided, such as between and including 0.375 to 0.625 inch, for example. A dome type resilient prominence may have a circular shaped perimeter trough or a square shaped perimeter trough. A dome shaped resilient prominence may have any suitable diameter, as determined by the radius of curvature, including, but not limited to, 0.0625 inch or more, 0.125 inch or more, 0.25 inch or more, 0.375 inch or more, 0.50 inch or more, 0.625 inch or more, 0.75 inch or more, 1.0 inch, 1.5 inch or more, 2.0 inches or more, 3 inches or more, and any range between and including the dome diameter provided.

In another embodiment, a resilient prominence may be elongated, whereby the apex is not a single point, as was the case with a dome shaped resilient prominence, but rather extends along a length. For example, an elongated type resilient prominence may have a curved cross-sectional profile, with an apex at the peak of the curve that may extend along the fabric for some length. Put another way, the resilient prominence may look like half cylinders running along the fabric. An elongated type resilient prominence may be linear, whereby the apex of the elongated type resilient prominence extends linearly. In another embodiment however, an elongated type resilient prominence is a curved type, whereby the apex of the elongated type resilient prominence is curved, and may have any suitable configuration, such as sinusoidal, spiral and the like. The troughs in this type of resilient prominence are on opposing sides of the elongated apex, where two adjacent elongated resilient prominences intersect or where the fabric flattens out to be substantially parallel with the fabric plane. An elongated resilient prominence may have any suitable length including, but not limited to, 0.25 inch or more, 1 inch or more, 3 inches or more, 5 inches or more, 10 inches or more, 20 inches or more, 50 inches or more, 70 inches or more, 100 inches or more and any length between and including the lengths provided.

In still another embodiment, a resilient prominence may be irregularly shaped having a larger interior volume portion and a smaller interior volume portion. For example, a resilient prominence may be a tear dropped shaped resilient prominence, wherein a larger interior volume is formed in one portion of the resilient prominence, and tappers down to a smaller interior volume portion. A resilient prominence may take the shape of letter and/or numbers and create a message or slogan. A resilient prominence may be shaped to provide camouflage, whereby a plurality of different shape resilient prominences are configured on the fabric. Any number of differently shaped resilient prominences are envisioned, and any combination of resilient prominences may be configured on a fabric. For example, one portion of a fabric, a torso portion of a jacket, for example, may comprise discrete dome shaped resilient prominences, and another portion of the fabric, the arm portion of said jacket, may comprise continuous elongated type resilient prominences. The size and type of resilient prominences may be selected to provide the desired performance attributes desired.

Any number and areal density of resilient prominence may be configured on a fabric surface including, but not limited to, 2 per square foot or more, 5 per square foot or more, 10 per square foot or more, 20 per square foot or more, 50 per square foot or more, 100 per square foot or more, 1000 per square foot or more, and any range between and including the areal densities provided. In another embodiment, a first resilient prominence is coupled to a second resilient prominence by a smaller volume channel. Air from a first resilient prominence may be configured to flow through said channel and into a second resilient prominence; thereby allows for airflow between the resilient prominences. Any number of resilient prominences may be airflow coupled, whereby air may flow between said prominences. A fabric comprising air-flow coupled resilient prominences may dampen an impact force, whereby a resilient prominence receiving an abrupt external load may deform and air retained therein, may be transferred to a coupled resilient prominence.

A fabric, as described herein, may comprise apertures that allows for airflow or permeation through the fabric or portion thereof. Apertures configured in specific location may provide for increased moisture management performance. Specifically, apertures configured in the resilient prominences may enable quicker drying times of a fabric that has water adsorbed thereon or therein, or may be designed to allow high humidity air to escape from inside the garment or structure Apertures may be selectively configured in the resilient prominences, such as at the apex of the resilient prominences. In one embodiment, an elongated type resilient prominence has a plurality of apertures configured along the apex. In another embodiment, a resilient prominence has a plurality of apertures configured randomly therethrough. In still another embodiment, apertures are configured in the fabric uniformly and/or randomly across the entire fabric. Apertures may have any suitable shape or size. In one embodiment, an aperture is a hole type aperture, whereby a portion of the fabric outer layer is a removed, such as by being cut away from the fabric. For example, a small circular cut-out from the outer layer of fabric is a hole type aperture, in another embodiment, an aperture is a slit type, whereby the outer layer of the fabric is slit and no substantial portion of the fabric is removed. A slit type aperture may be a slit in one linear direction or may comprise a plurality of slits that intersect, such as a cross slit, where two slits of approximately the some length are configured substantially at ninety degrees to each other and intersect approximately at the midpoint of their length. In yet another embodiment, a slit type resilient prominence comprises a slit that outlines a portion of a shape, such as a square or circle. A tab type resilient prominence may comprise a slit that extends substantially around a shape whereby the fabric therein has a free end that can lift up from the fabric surface. An aperture may have any suitable size and shape. For example, a hole type aperture may have any suitable area removed from the fabric, such as no more than about 4 mm$^2$, no more than about 10 mm$^2$, no more than about 20 mm$^2$, no more than about 50 mm$^2$, no more than about 100 mm$^2$, and any range between and including the area values provided. A slit type aperture, may have any suitable length including, but not limited to, no more than about 1 mm, no more than about 3 mm, no more than about 5 mm, no more than about 10 mm, no more than about 25 mm, and any range between and including the length values provided.

In another embodiment, a one-way valve may be configured into the fabric to allow some of the air to escape carrying hot, high humidity air from the inside surface while substantially preventing cold or outside air from entering form the outside surface of the fabric. A one-way flow valve may be a fabric flap that only opens to allow air out, or may be any other suitable type of valve.

A resilient prominence is resilient in shape, whereby the resilient prominence may be compressed and then popped back into substantially the original shape. The resilient prominence may be popped back into shape by any suitable method including, flexing or bending the fabric, pulling the fabric, stretching the fabric, heating the fabric and the like. The resilient prominences may be configured to return back substantially to their original shape when the fabric is pulled in one or more directions. Polymers, films, fabrics, designs of shapes and shape memory type materials may be used to assist in the reforming of the resilient prominences. A fabric, as described herein may be flexible and may be configured to stretch to some extent. In some embodiments, a resilient prominence is a self-resilient prominence, whereby the resilient prominence returns to its original shape when a compression force is removed. An elastomeric material may be used in a self-resilient prominence, for example, wherein an elastomer in put in stress when a resilient prominence is deformed and forces the resilient prominence back into substantially the original shape to relieve the stress. An elastomeric material may be a film, coating or filler material for the interior volume of a resilient prominence. In one embodiment, elastomeric material is imbibed into or coated onto a fabric layer and may be a continuous coating having apertures therethrough, or may be discrete, having open areas of uncoated fabric between coated or imbibed areas. In other embodiments, elastomeric material is configured within or on the fabric, but not in the resilient prominence portion of the fabric. In still another embodiment, a spring, or spacer type fabric having a structure that assists in reforming the prominence, may be configured in the fabric to provide for a self-resilient prominence. For example, a dome shaped resilient prominence may comprise a bent piece of spring metal that pops back into the arc shape of the dome when a compression force is removed. In another embodiment, an elastomeric and/or foam material is configured within the interior volume of a resilient prominence and provides elastic or resilient properties when compressed.

In another embodiment, an elastomeric material is first stretched and then bonded to the planar material or fabric such that the planar material develops resilient prominences when the elastomeric material is allowed to relax. The surface of the planar material or fabric may buckle to form random type resilient prominences when the elastomer relaxes. In another embodiment, the resilient prominences are configured to have a non-random pattern such as a word, logo or image. In another embodiment, heat is used to durably compress a foam or spacer fabric leaving uncompressed sections that form raised prominences that can be covered by fabrics or films to form a resilient prominence structure.

A fabric or fabric layer may be made out of any suitable material or combination of materials including, but not limited to, non-woven, woven, knits, webbing, netting, composite fabrics structures like spacer fabrics, thermoplastic or thermoset polymers, polymer films, spring materials, and the like. Fabric materials may be natural, synthetic or any suitable combination thereof. In one embodiment, a fabric or fabric layer comprises a non-woven layer of material attached to a polymer film. The polymer film may allow for the formation of the resilient prominences through vacuum forming, hydro forming or pressing into a screen, die or other type of forming device, for example. The polymer film may be non-permeable during formation of a fabric layer and subsequently perforated whereby at least one aperture is formed in the polymer film. For example, a non-permeable polymer film would allow a composite, or laminate of two layers to be vacuum formed together and an aperture could be formed in the laminate after vacuum forming another embodiment, a laminate or composite material may have a pre-resilient prominence formation permeability and the formation of the resilient prominences may increase or decrease the permeability of the material in the area of the resilient prominences. For example, a laminate of a polymer film and woven material may comprise a plurality of randomly oriented apertures and the formation of a resilient prominence may stretch the apertures to increase the permeability. Heat may be applied before, during or after vacuum forming to bond two layers of material together. In another embodiment, a polymeric or other type of microsphere, resilient sphere and/or various fillers may be incorporated into the interior volume of resilient prominence to add other benefits like phase change, durability, insulation or other added on benefits.

The fabric, as described herein may comprise a first surface with a first surface fabric layer comprising resilient prominences and a second and opposing surface to the first surface comprising a second surface fabric layer that may also comprise resilient prominences. The fabric may be configured such that the first surface resilient prominences and second surface resilient prominences align with each other. For example, a fabric may comprise a dome shaped resilient prominence on a first surface having an apex that is substantially aligned with the apex of a dome shaped resilient prominence on the opposing second side of the fabric. In another embodiment, a linear type elongated type resilient prominence on a first fabric surface may be aligned with a linear type elongated type resilient prominence on a second fabric surface. The resilient prominences on first and second surfaces of a fabric may however be offset, alternating or complimentary in configuration and alignment. For example, a linear type elongated type resilient prominence on a first fabric surface may be alternating in configuration with a linear type elongated type resilient prominence on a second fabric surface, whereby the apex of the resilient prominence on a first side is configured parallel with and between two apices of resilient prominences on the second side, as shown and described herein.

The interior volume of the resilient prominences may be void of material or may be at least partially filled with a fill material or combination of fill materials. For example, a high thermal insulation fill material may be configured in the interior volume of a resilient prominence. In another embodiment, the fill material comprises a resilient material such as a fibrous batting, a foam, microsphere, phase change material, or elastomeric material. In one embodiment, the interior volume of the resilient prominences is substantially hollow, having a void volume of at least about 50% or more, at least about 75% or more, at least about 90% or more, and any range between and including the void volumes provided. In still another embodiment, a resilient prominence is hollow, having substantially no material in the interior volume.

A fabric, as described herein, may comprise any number of layers of material on a first or second fabric layer or between said layers. Any suitable type of fabric may be used in any portion of the fabric as required for the application. In one embodiment a hydrophobic material is incorporated in at least one layer, and preferably on an outside surface, or first surface. The first surface of the fabric may be configured for orientation out, or toward the elements, when the fabric is used in a garment or sleeping bag, for example.

A fabric, as describe herein, may provide durable thermal insulation properties. Air trapped in the interior volume of resilient prominences, would not settle over time and would not clump if the fabric was exposed to liquid.

The fabric, as described herein, may be used for any number of high speed sports garments. The fabric may reduce drag and/or reduce rotational forces caused by air moving over the garment. High speed sports and recreational activities including, but are not limited to operating a motorcycle, speedboat, jet-ski, snow-mobile, hand-glider, or skiing, snowboarding, bicycle riding, skateboarding, base-jumping, parachuting from air craft, wind-surfing, surfing and the like.

The fabric, as described herein, may provide for further improvements in camouflage, in both visible and IR wavelengths. The improvement may be derived from the non-planar surface of the fabric, whereby the exposure of the resilient prominences on the outer surface of the garment may reflect and/or absorb energy in a way that is less detectable. Two-dimensional digital images have been shown to be effective in visual camouflage fabrics designed to suppress visual recognition. This effect is further improved by creating a digital three-dimensional representation of the shadows formed by resilient prominences and matching these to the surroundings. The same is true in the IR range a non-planar surface having prominences and troughs along the outer surface is not as easily distinguished in an IR camera. The output of an IR camera is a flat two-dimensional image, and flat surfaces in the field of view may be easily distinguished. For example, human bodies are recognized by their outline and consistent tone. A human may be more difficult to distinguish if the person is wearing a garment that has an irregular surface.

The fabric, as described herein, may comprise any number of suitable camouflage materials configured in any suitable orientation, such as is various patterns to mimic the local environment or background of use. Suitable camouflage materials include, but are not limited to, dyes, pigments, conductive materials, such as vapor deposited metal, and/or conductive fillers in the fabric, yarn, or coatings configured into or on the fabric.

The fabric as described herein, may be used in any number of different camouflage applications including, but not limited to, garments, covers, curtains, blinds, tarps, sleeping bags, and the like. In an exemplary embodiment, a fabric as described herein is configured as the outer layer of a cover or blanket that is placed over a gun emplacement to prevent detection and provide protection from weather. In another exemplary embodiment, a fabric comprising resilient prominences on the outer surface is placed over a vehicle, such as a tank to camouflage the tank from aerial detection. In still another exemplary embodiment, an enclosure, such as a tent or other temporary dwelling comprises fabric, as described herein, as the outer surface of the enclosure.

In one embodiment, a fabric as described herein comprises a first surface comprising a resilient prominence wherein the fabric is air permeable. The resilient prominences may be configured over substantially the entire first surface of the fabric and the resilient prominences may be discrete, or continuous. A discrete resilient prominence has a trough around the entire perimeter of the resilient prominence that is coupled with the plane of the first layer of the fabric, as shown and described herein.

In an exemplary embodiment, a fabric comprises a first surface that has a fabric layer with resilient prominences and the fabric is air permeable. Resilient prominences may be configured over substantially the entire first surface of the fabric. A resilient prominence may comprise an apex and troughs on at least two sides. Resilient prominences may be discrete, continuous, elongated, linear, curved dome shaped, irregularly shaped or any combination thereof. Any combination of resilient prominences may be configured in a fabric.

The second surface of a fabric may comprise a fabric layer that has resilient prominences as described herein. A resilient prominence on a second side may align with a resilient prominence on a first side. In another embodiment, a resilient prominence on a second side is configured in a complimentary orientation to a resilient prominence on a first side. In a third example of this embodiment, the second surfaces comprises a flat layer that is bonded to the fabric only on the flats and serves to enclose the volume of each resilient prominence.

The fabric as described herein may be air permeable and may comprise apertures in a first and/or second layer. Apertures may be configured uniformly in a fabric layer or in specific locations, such as only on the resilient prominences or only at the apex of resilient prominences. The fabric may comprise apertures that are no larger than 0.3 mm in diameter, no larger than 0.1 mm in diameter, for example. Apertures may have any suitable areal density including, but not limited to, one aperture per square inch or more, five apertures per square inch or more, ten apertures per square inch or more, twenty apertures per square inch or more and any range between and including the values provided.

The fabric, as described herein may comprise any number of layers comprising any suitable materials. In one embodiment, a dimensionally stable layer and a fabric layer are combined and/or attached. In another embodiment, a fabric layer comprises a polymeric film layer having apertures and a non-woven fabric layer. In yet another embodiment, the fabric layer comprises a polymeric film layer having apertures and a woven fabric layer. The fabric may comprise a reflective layer or material attached to the fabric. A reflective material may comprise metal and may be vapor deposited metal. Fabric layers may be attached or integrally attached such as by lamination whereby the two fabric layers are attached substantially over the entire surface with an attached portion every 0.125 inch or less.

The summary of the invention is provided as a general introduction to some of the embodiments of the invention, and is not intended to be limiting. Additional example embodiments including variations and alternative configurations of the invention are provided herein.

BRIEF DESCRIPTION OF THE DRAWINGS

The accompanying drawings are included to provide a further understanding of the invention and are incorporated in and constitute a part of this specification, illustrate embodiments of the invention, and together with the description serve to explain the principles of the invention

DETAILED DESCRIPTION OF THE ILLUSTRATED EMBODIMENTS

Figure 1A:
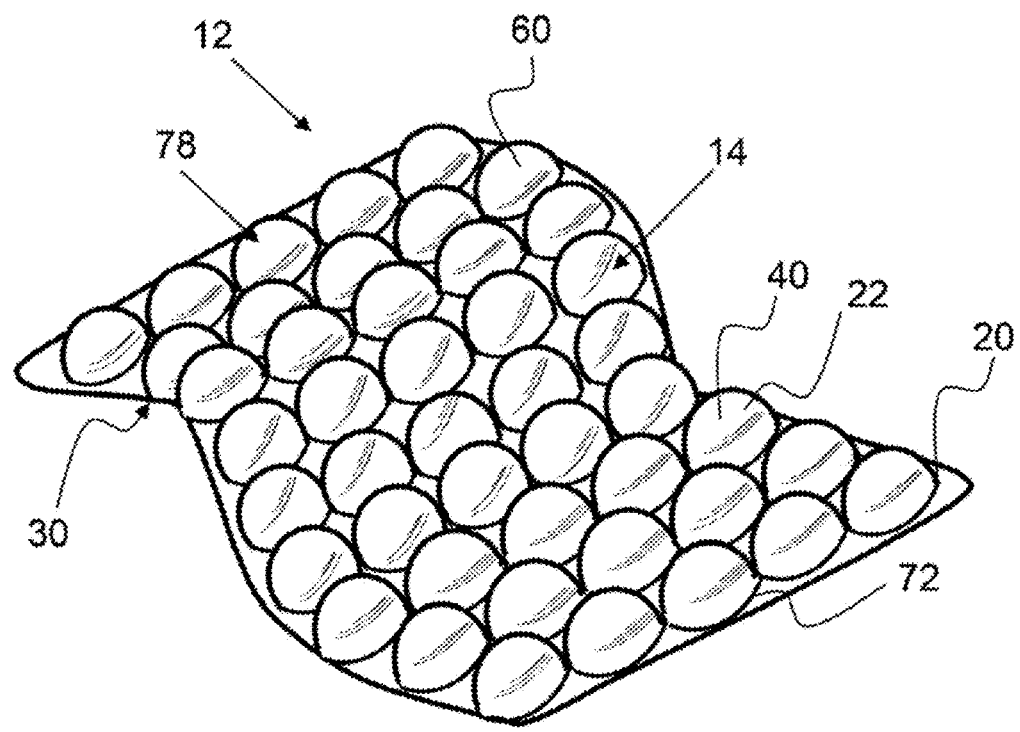

FIG. 1A shows an isometric view of an exemplary fabric comprising a plurality of dome type resilient prominences.

Figure 1B:
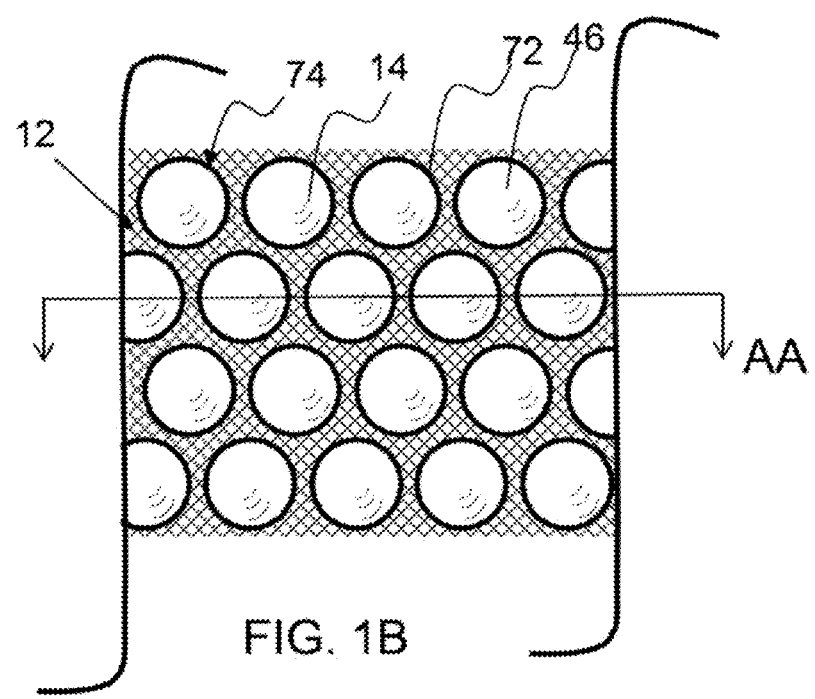

FIG. 1B shows a top down view of the exemplary fabric shown in FIG. 1A.

Figure 1C:
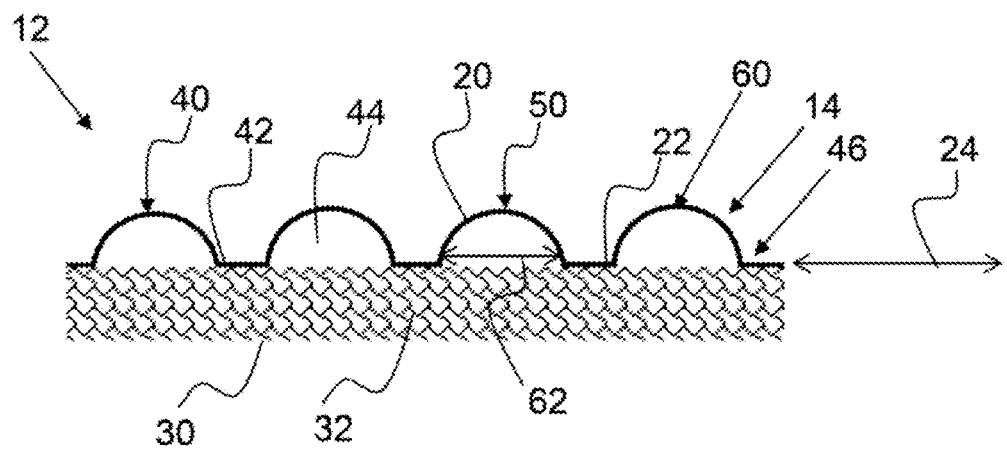

FIG. 1C shows a cross-sectional view of the exemplary fabric shown in FIG. 1B taken along line AA.

Figure 1D:
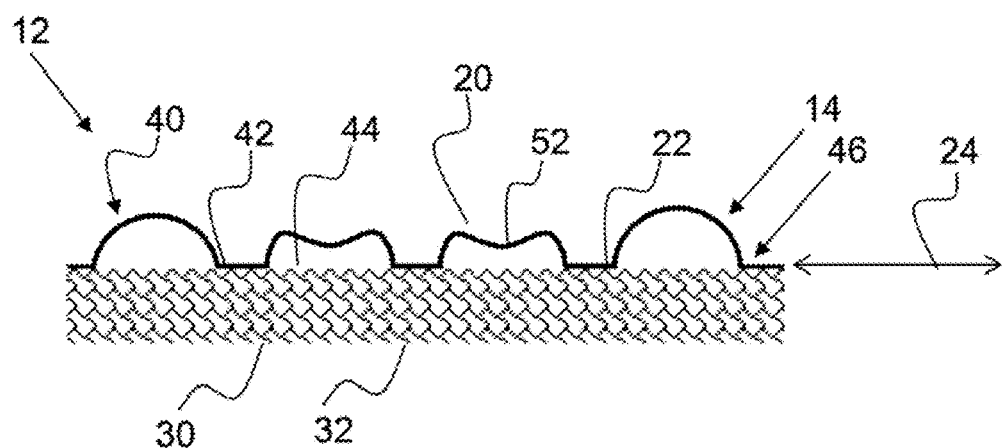

FIG. 1D shows a cross-sectional view of the exemplary fabric shown in FIG. 1B taken along line AA with several of the resilient prominences deformed.

Figure 2A:
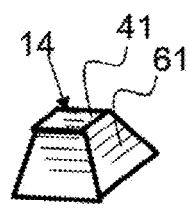

FIG. 2A shows an isometric view of an exemplary dome shaped resilient prominence having four sides and a flat apex.

Figure 2B:
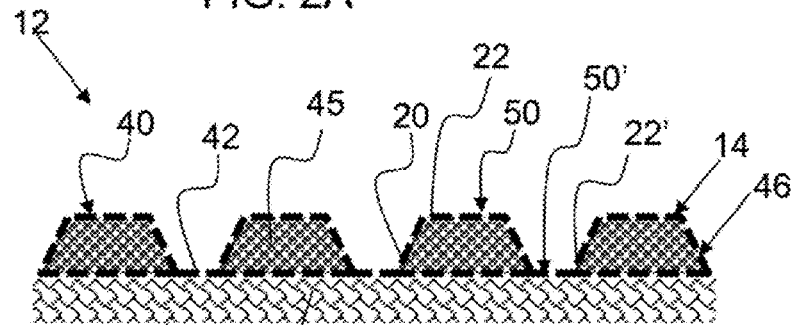

FIG. 2B shows a cross sectional view of an exemplary fabric comprising discrete resilient prominences having the general shape of that shown in FIG. 2A and a fill material configured in the interior volume of the resilient prominence.

Figure 3:
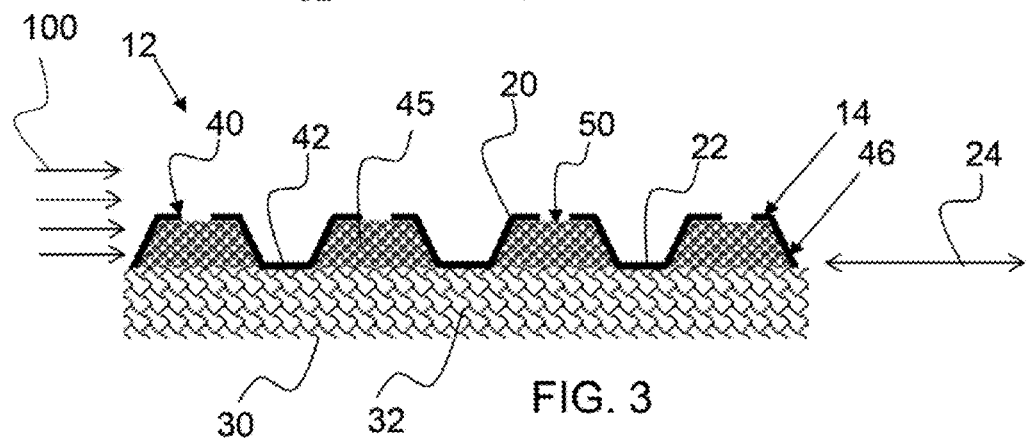

FIG. 3 shows a cross sectional view of an exemplary fabric comprising resilient prominences with apertures configured in the apex.

Figure 4:
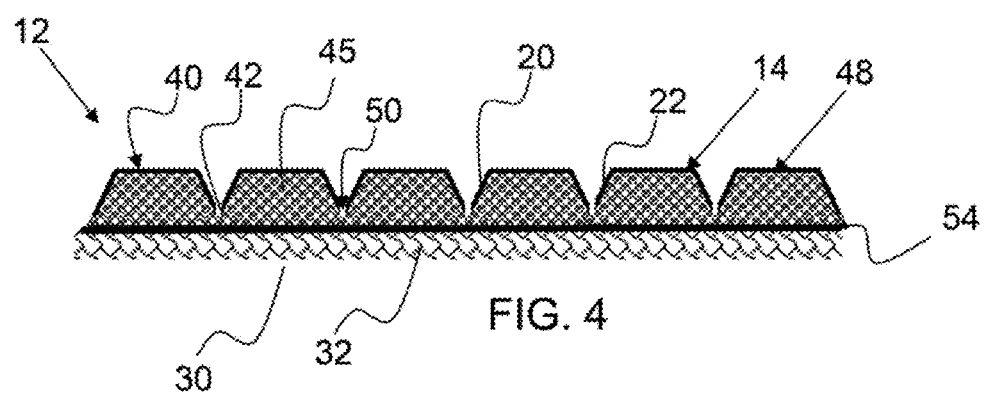

FIG. 4 shows a cross sectional view of an exemplary fabric comprising resilient prominences with apertures configured in the troughs.

Figure 5:
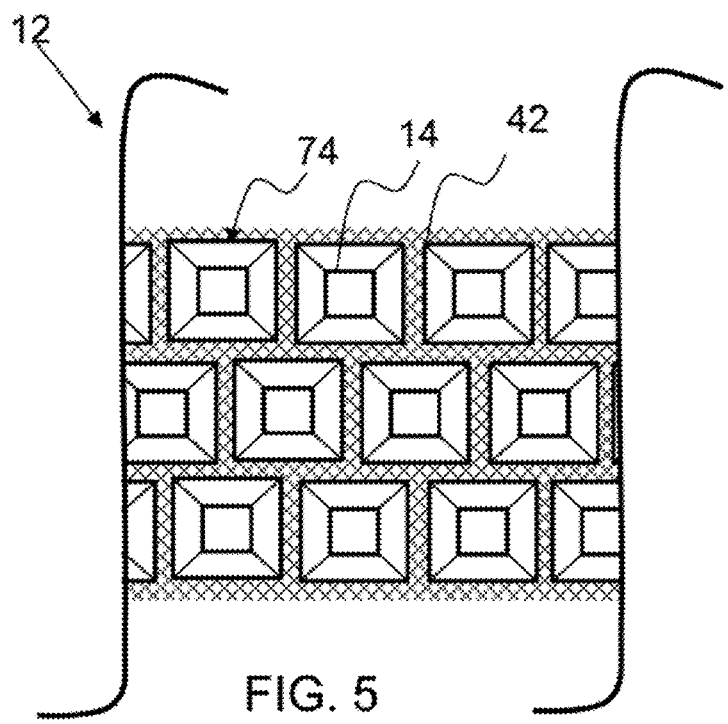

FIG. 5 shows a top down view of the exemplary fabric shown in FIG. 2B.

Figure 6:
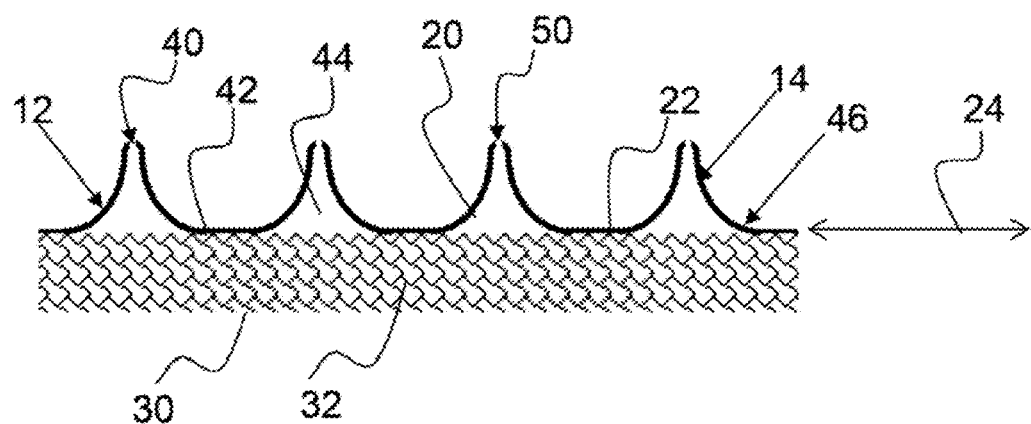

FIG. 6 shows a cross sectional view of an exemplary fabric comprising resilient prominences with apertures configured in the apex.

Figure 7:
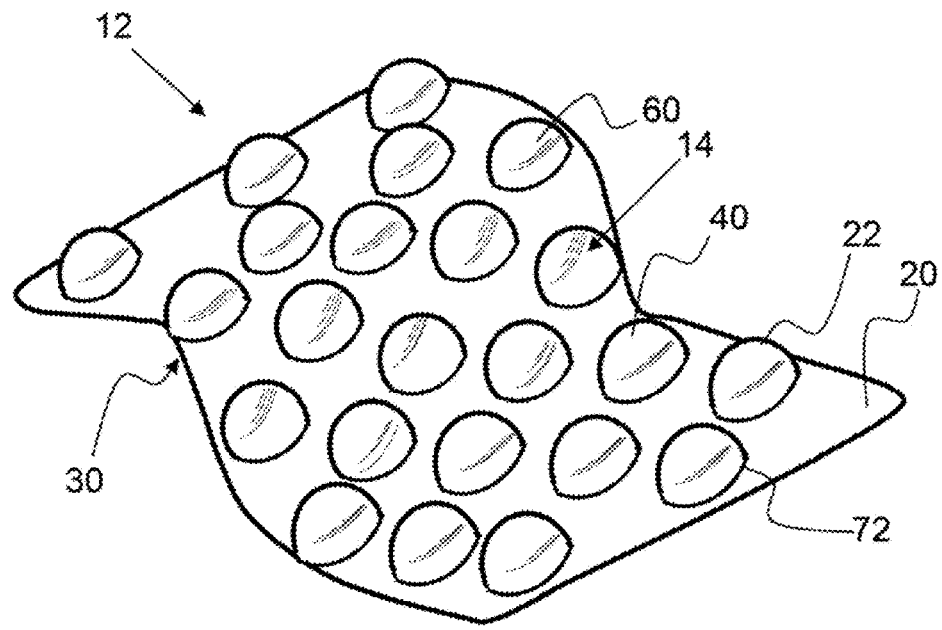

FIG. 7 shows an isometric view of an exemplary fabric comprising a plurality of dome type resilient prominence configured randomly over the fabric surface.

Figure 8:
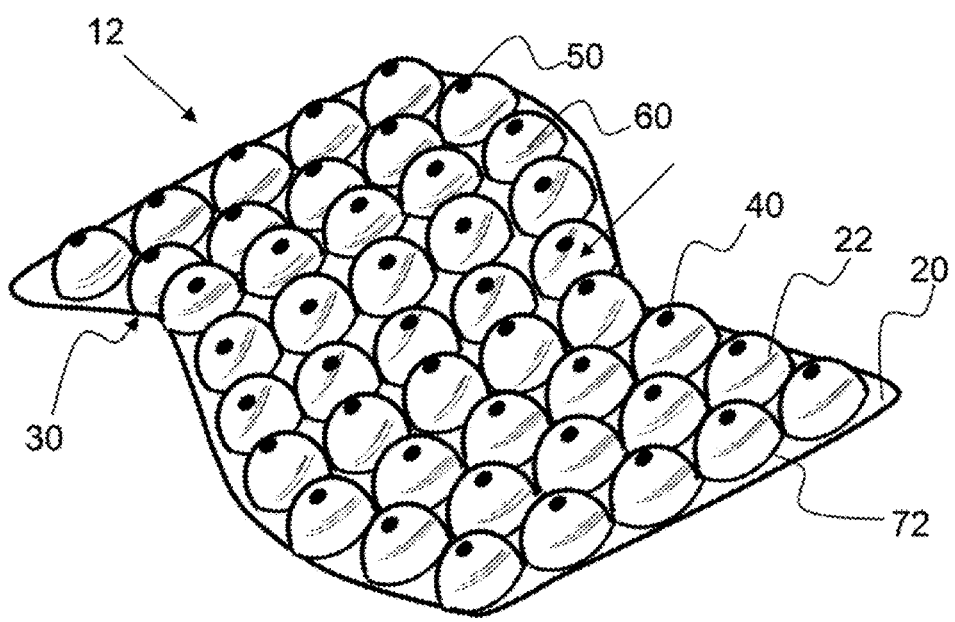

FIG. 8 shows an isometric view of an exemplary fabric comprising a plurality of dome type resilient prominence configured uniformly over the fabric surface and having an aperture configured in the apex.

Figure 9:
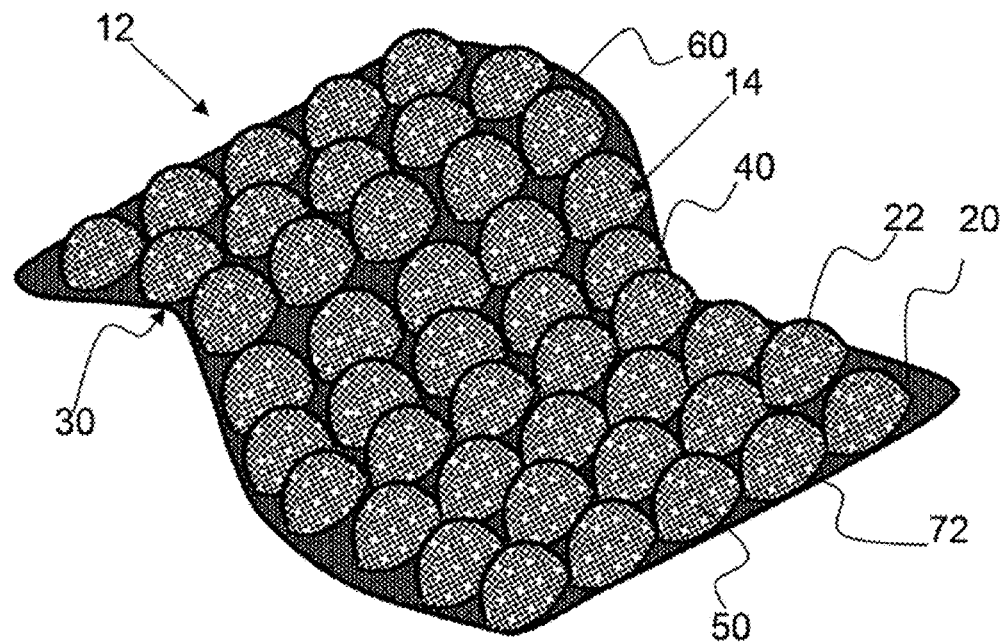

FIG. 9 shows an isometric view of an exemplary fabric comprising a plurality of dome type resilient prominence having randomly configured apertures.

Figure 10:
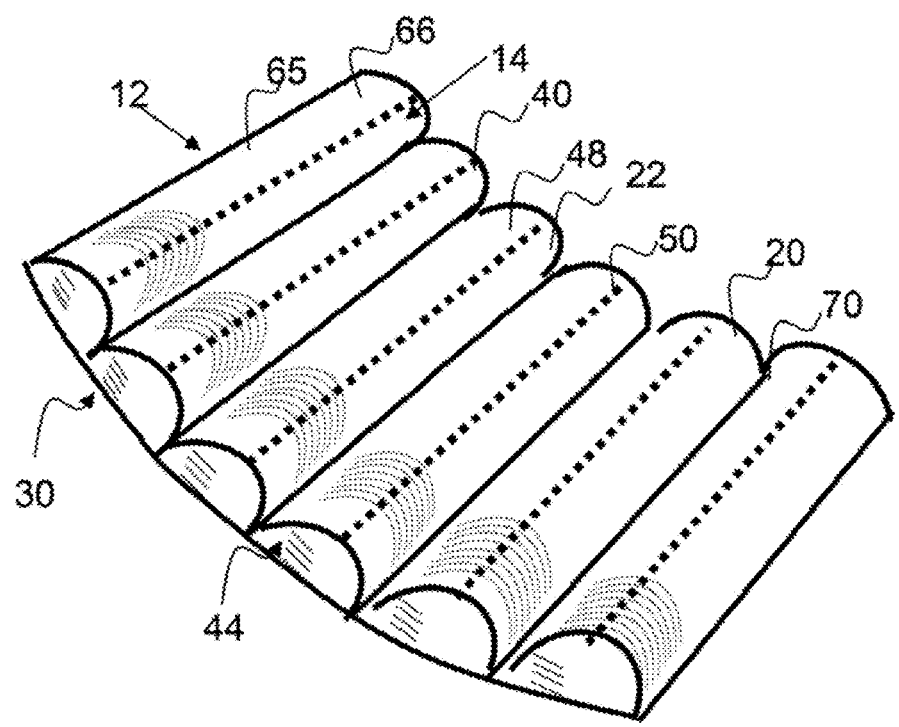

FIG. 10 shows an isometric view of an exemplary fabric comprising a plurality of elongated type resilient prominence having apertures configured along the apex of the linear resilient prominences.

Figure 11:
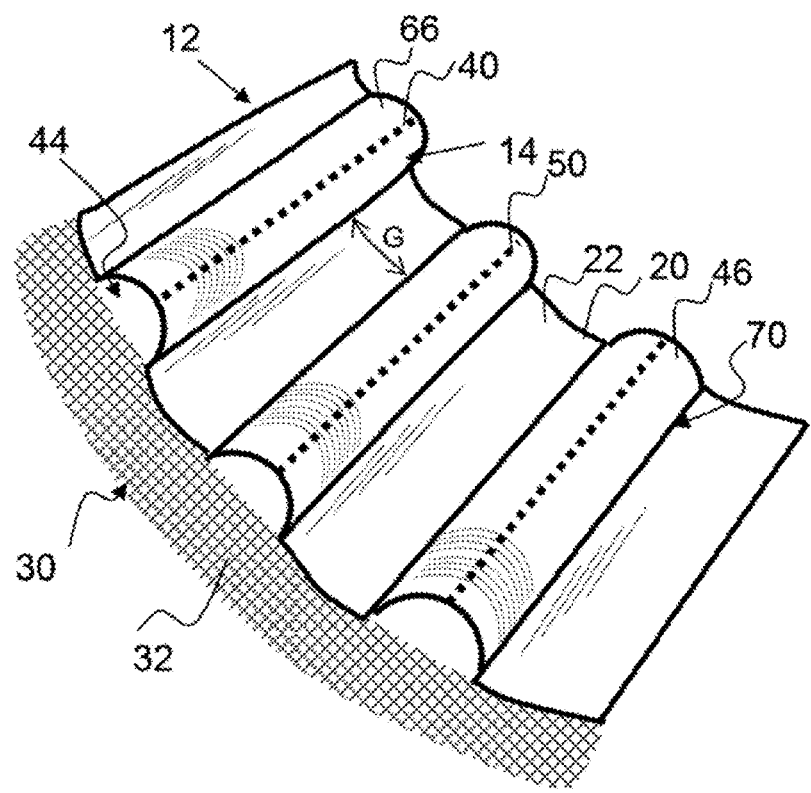

FIG. 11 shows an isometric view of an exemplary fabric comprising a plurality of linear type resilient prominence attached to a second surface layer.

Figure 12:
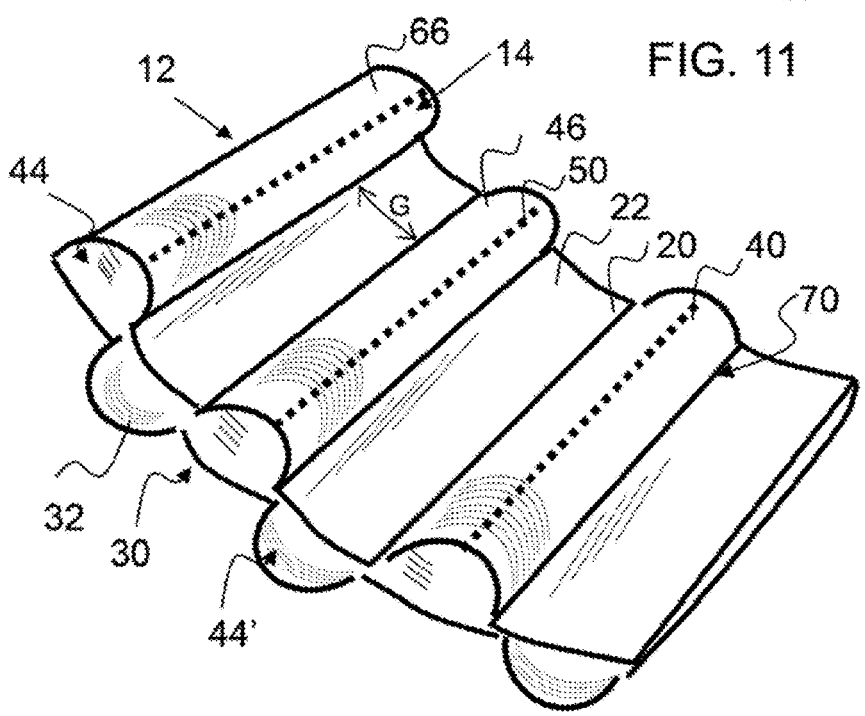

FIG. 12 shows an isometric view of an exemplary fabric comprising a plurality of elongated linear type resilient prominence on the first surface and the second surface of the fabric.

Figure 13:
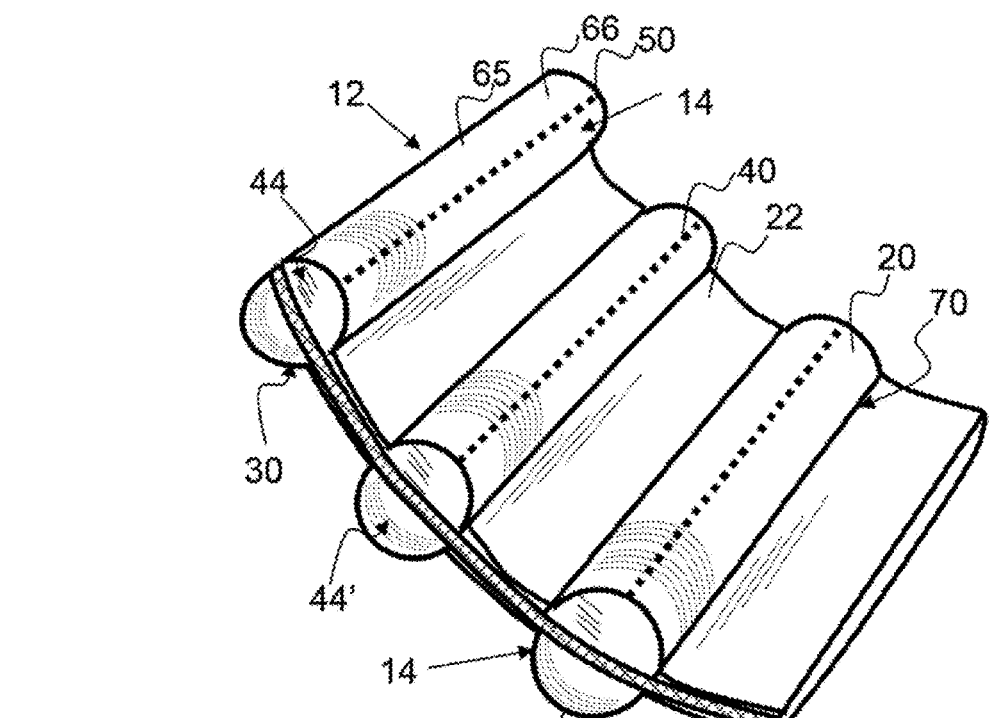

FIG. 13 shows an isometric view of an exemplary fabric comprising a plurality of elongated linear type resilient prominence on the first surface and the second surface of the fabric, and an interior layer configured there between.

Figure 14:
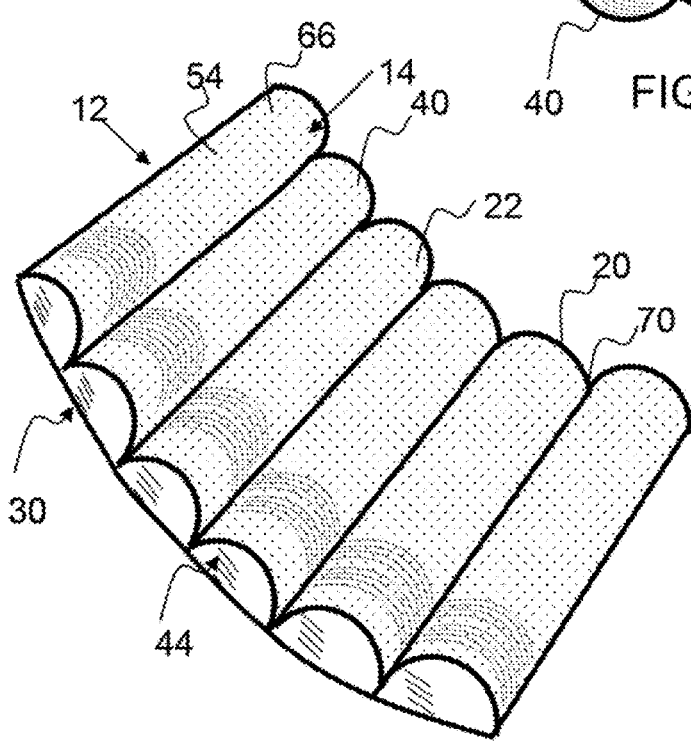

FIG. 14 shows an isometric view of an exemplary fabric comprising a plurality of elongated linear type resilient prominence configured out of a permeable material.

Figure 15:
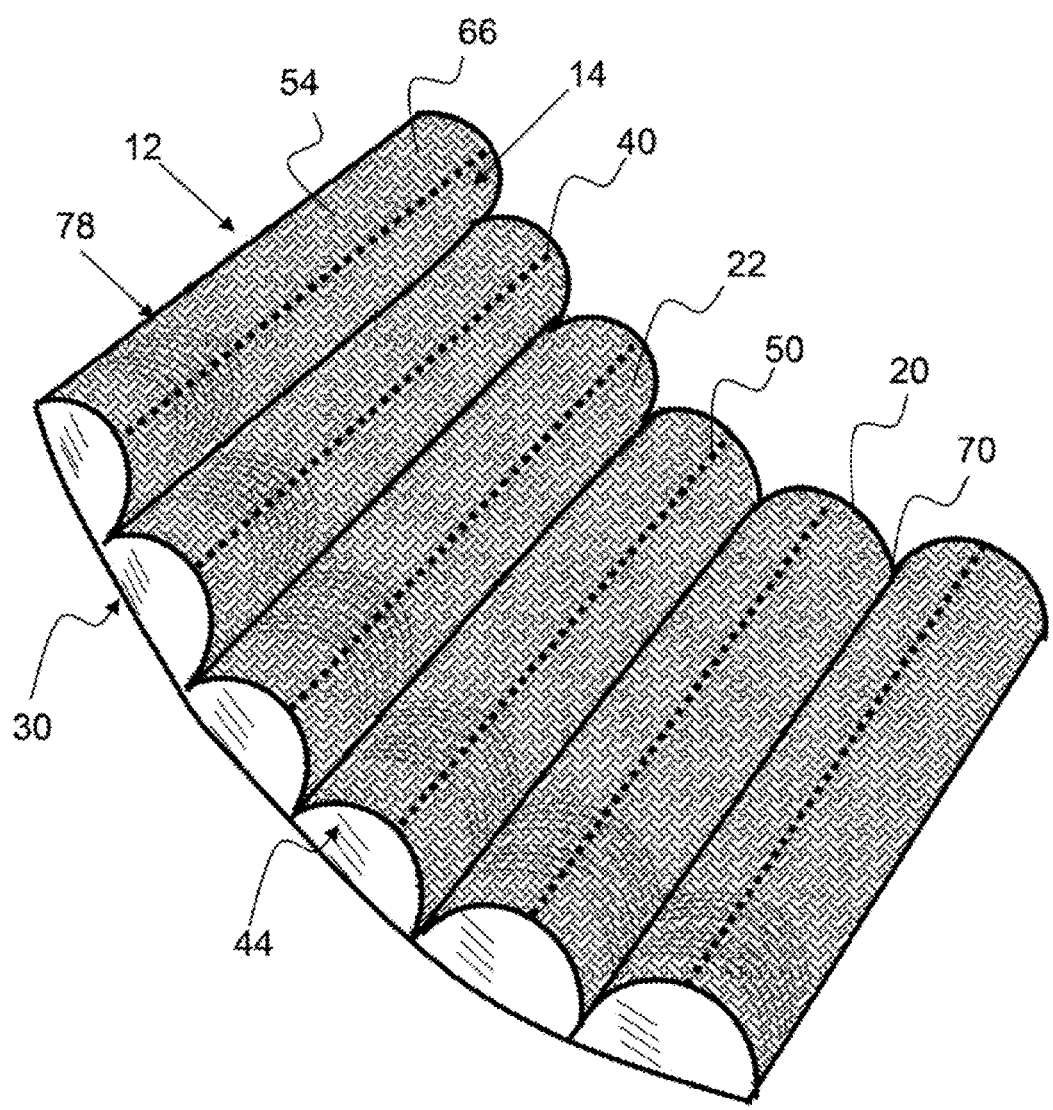

FIG. 15 shows an isometric view of an exemplary fabric comprising a plurality of elongated linear type resilient prominence configured out of a permeable material and having apertures configured along the apices.

Figure 16:
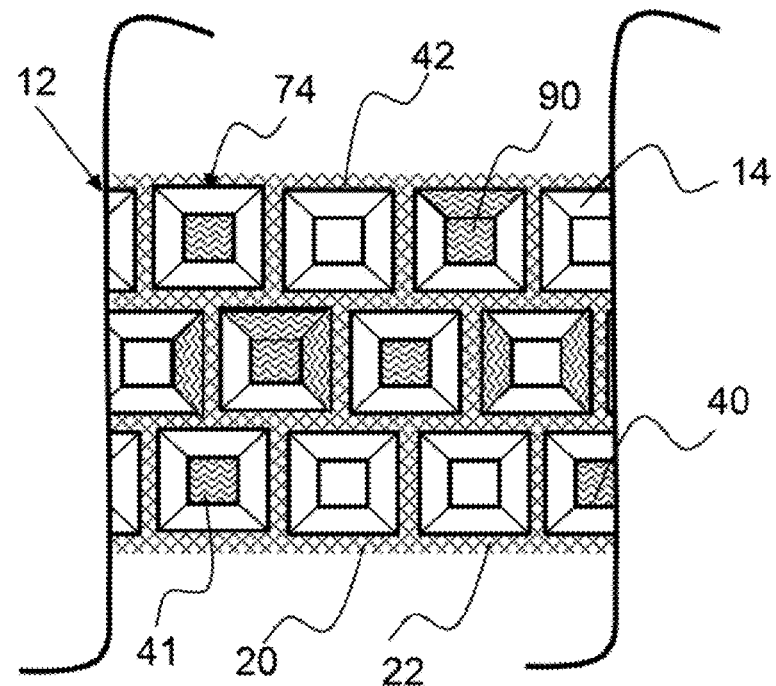

FIG. 16 shows a top down view of an exemplary fabric comprising a plurality of resilient prominences having reflective material configured thereon.

Figure 17:
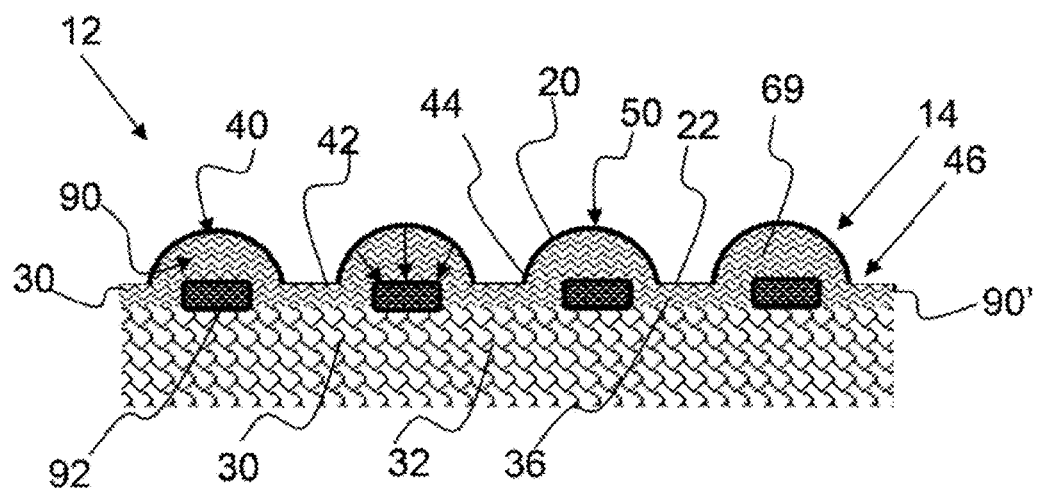

FIG. 17 shows a cross-sectional view of an exemplary fabric comprising a plurality of dome type resilient prominences having reflective material configured therein.

FIG. 18A shows an isometric view of an exemplary resilient prominence.

FIG. 18B shows a top down view of the resilient prominence shown in FIG. 18A.

FIG. 19A shows a top down view of an exemplary resilient prominence.

FIG. 19B shows a cross-sectional view of the resilient prominence shown in FIG. 19A taken along line ZZ.

Figure 20:
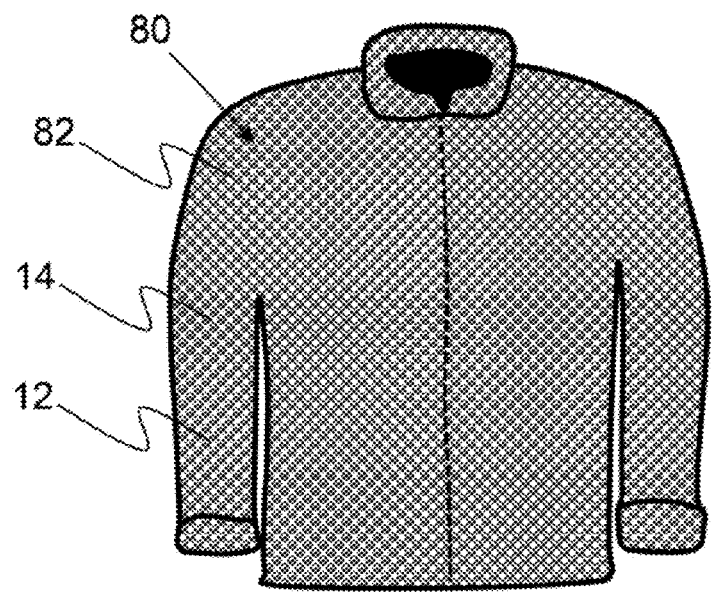

FIG. 20 shows a front view of an exemplary garment comprising the fabric as described herein.

Figure 21:
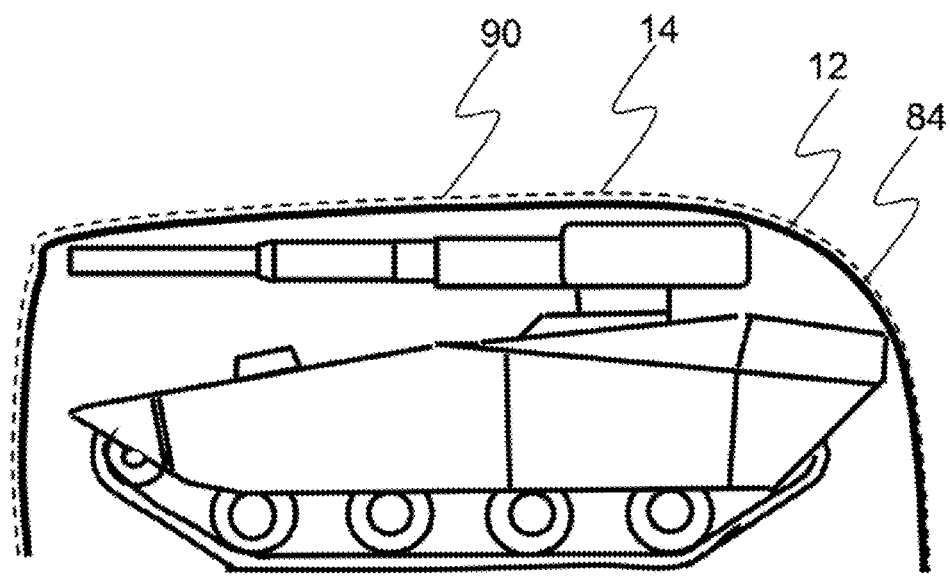

FIG. 21 shows a side view of an exemplary cover of fabric, as described herein, draped over a tank.

Figure 22:
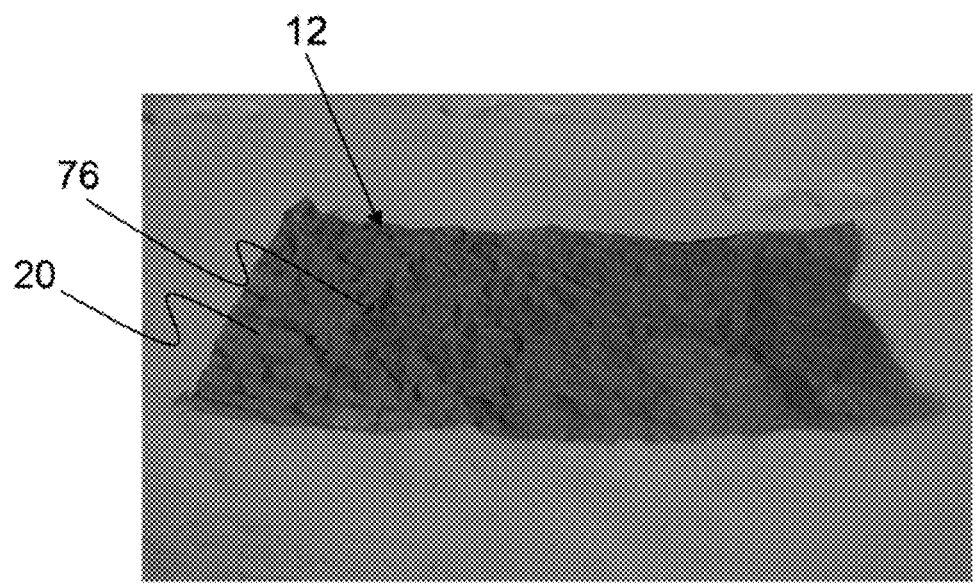

FIG. 22 is a picture of an exemplary fabric having random type resilient prominences as described herein.

Figure 23:
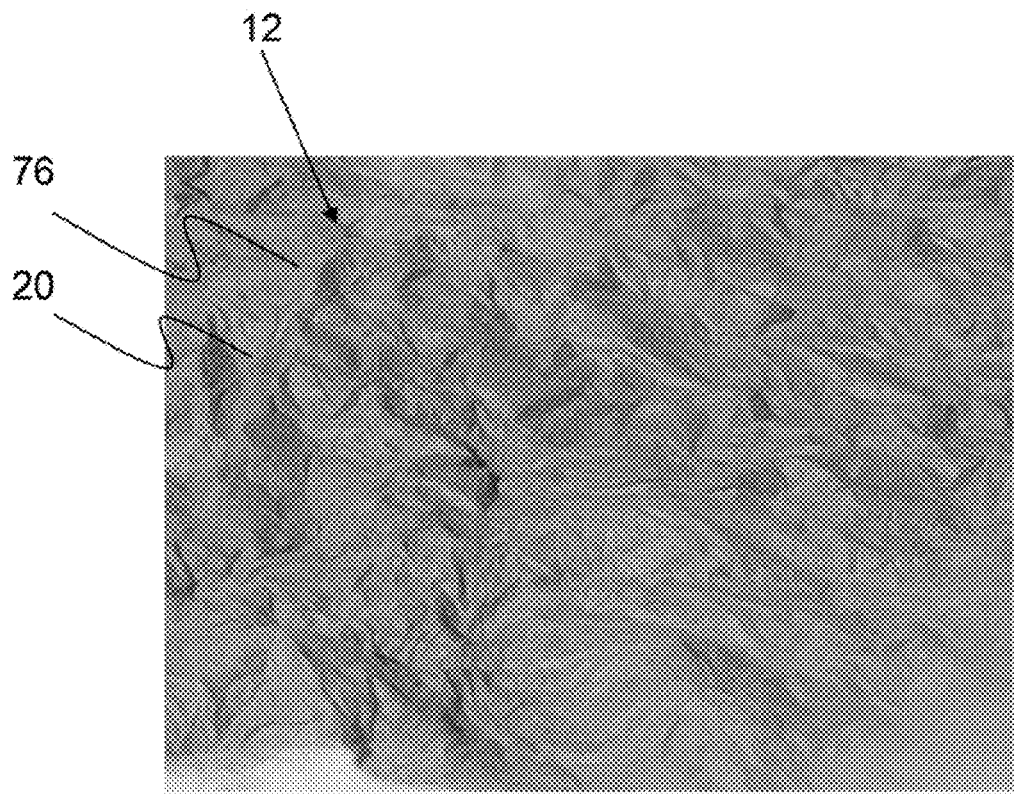

FIG. 23 is a picture of an exemplary fabric having random type resilient prominences as described herein FIGS. 24A-24D show top down views of a fabrics with various types of apertures.

Figure 25A:
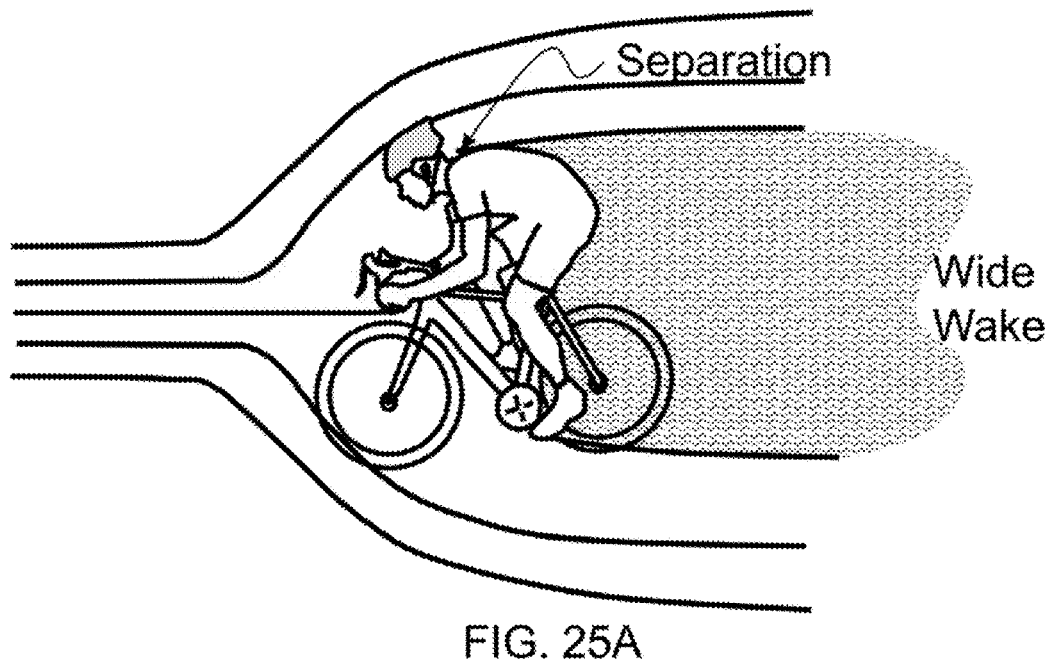

FIG. 25A shows a side view of a cyclist wearing a standard garment and the flow lines around the cyclist.

Figure 25B:
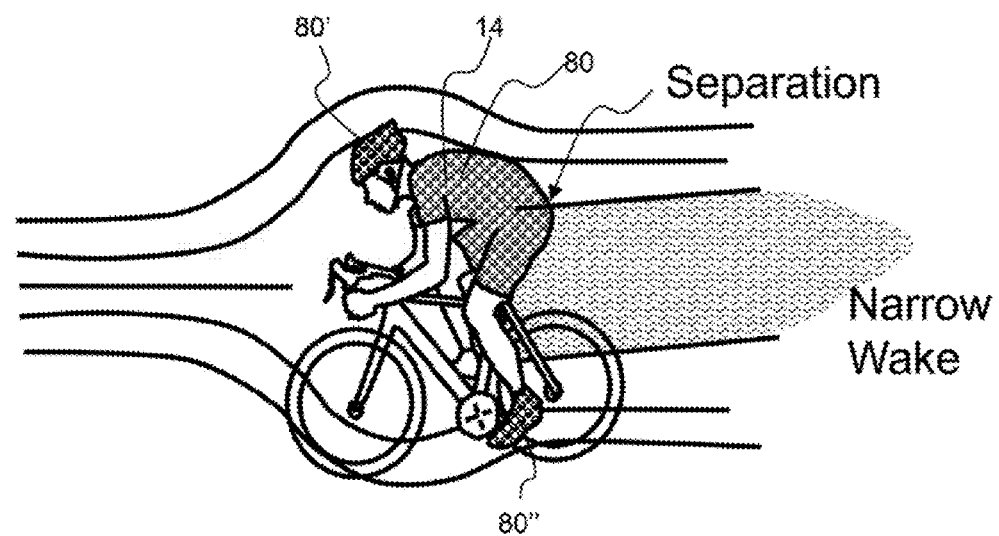

FIG. 25B shows a side view of a cyclist wearing a resilient prominence garment and the flow lines around the cyclist.

Figure 26A:
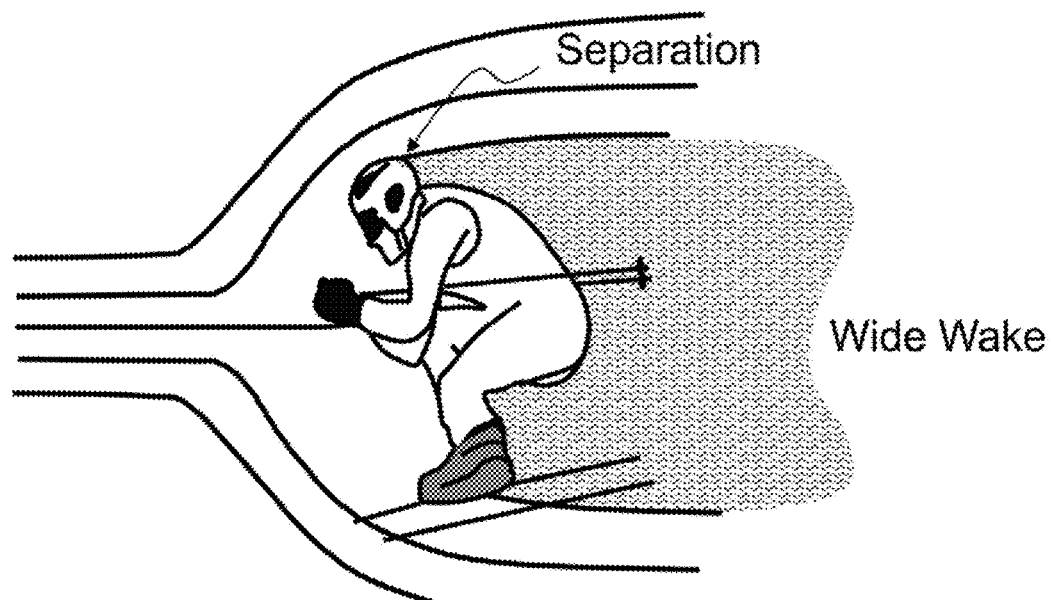

FIG. 26A shows a side view of a skier wearing a standard garment and the flow lines around the skier.

Figure 26B:
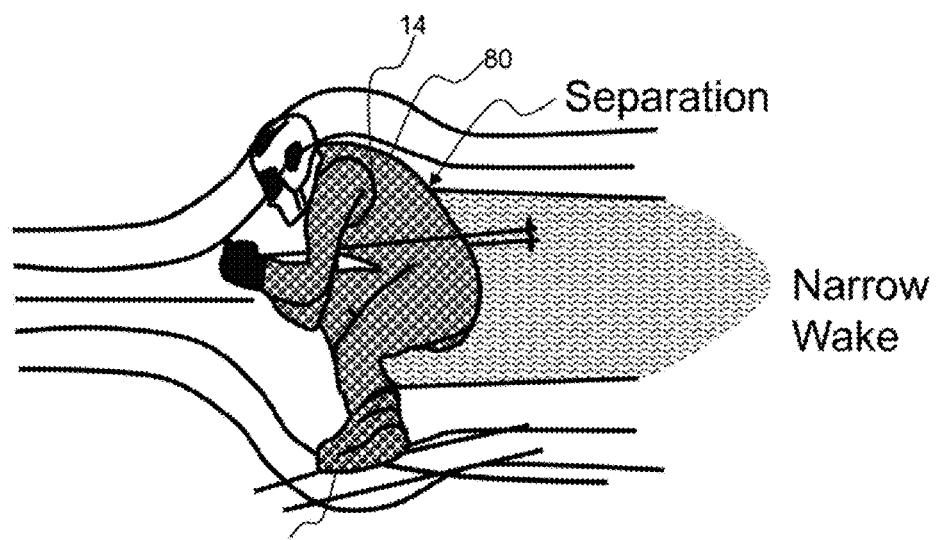

FIG. 26B shows a side view of a skier wearing a resilient prominence garment and the flow lines around the skier.

Figure 27:
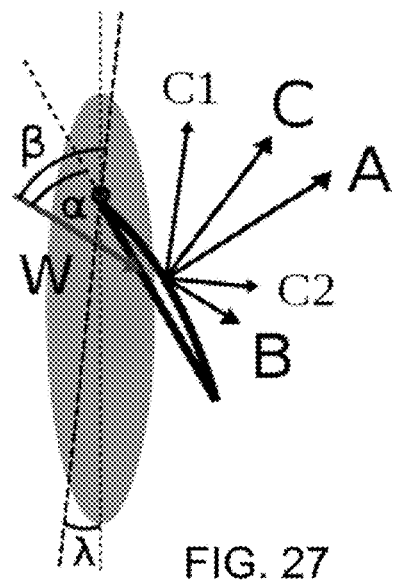

FIG. 27 shows a top down view of a sail boat and a sail.

Figure 28:
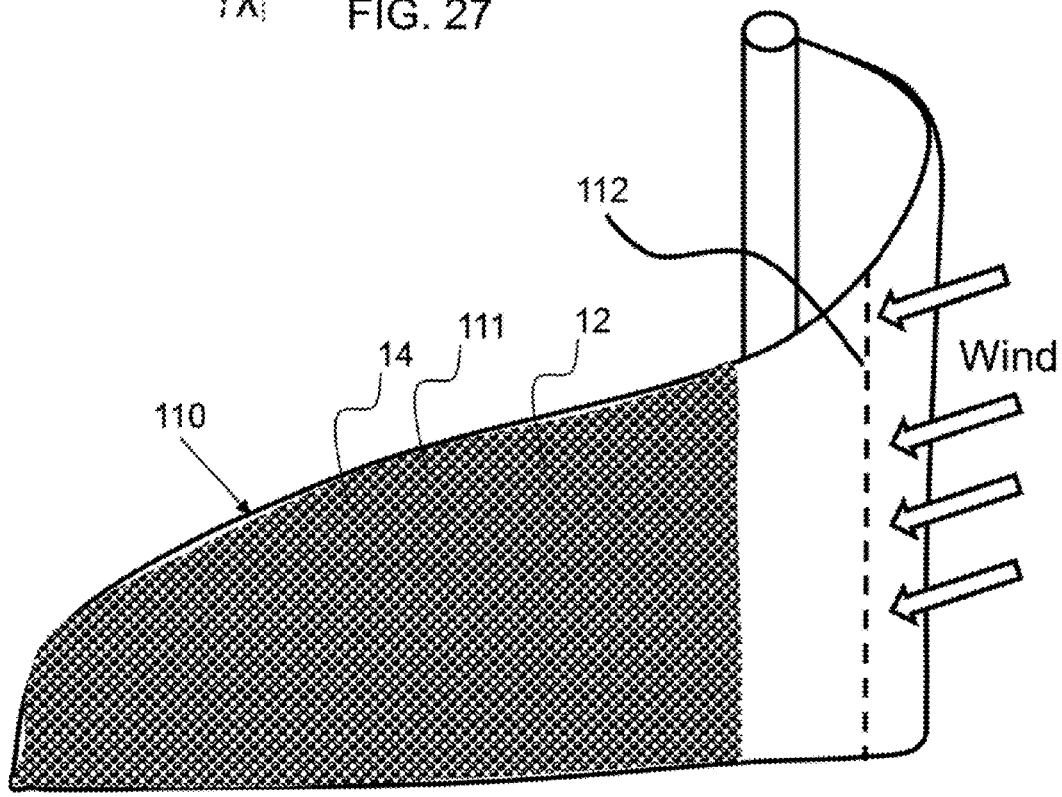

FIG. 28 shows an isometric view of sail having a fabric comprising resilient prominences on a portion of the sail.

Figures 29, 30:
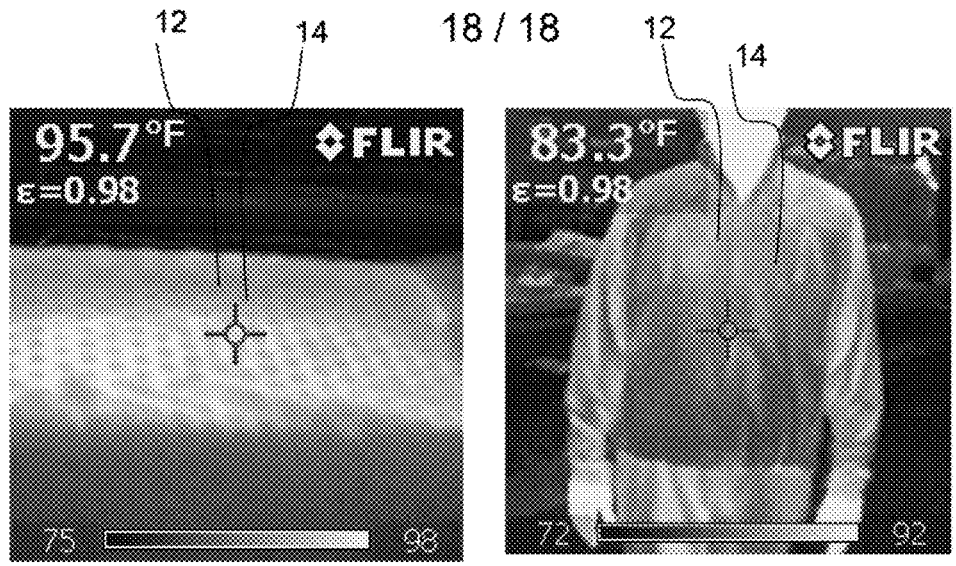

FIG. 29 is a thermal image taken with an infrared camera of a resilient prominence fabric laying over a hot plate.

FIG. 30 is a thermal image of a person wearing a jacket having resilient prominences.

Figure 31:
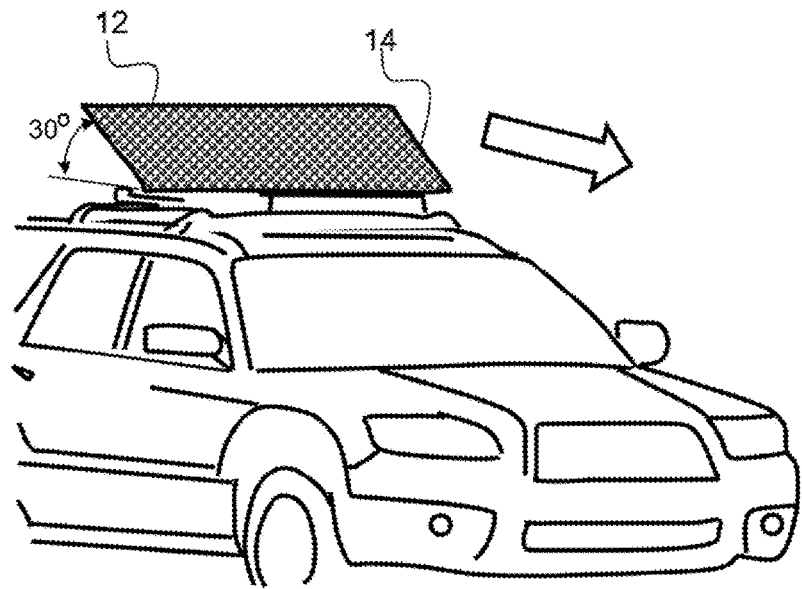

FIG. 31 shows a photograph of the car-top wind resistance test.

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

As shown in FIG. 1A, an exemplary fabric 12 comprises a plurality of dome type 60 resilient prominence 14. The first surface 20 has an uneven surface as a result of the resilient prominences. The second surface 30 is flat however. The resilient prominences shown in FIG. 1A are a shaped type resilient prominences having a plurality of geometrically shaped resilient prominences 78 on at least one surface as described herein.

As shown in FIG. 1B the resilient prominences 14 are discrete type 46 resilient prominences 14, whereby their perimeters 74 are not overlapping with one another and are along the fabric plane. The dome type resilient prominences have circular troughs 72.

As shown in FIG. 1C, the cross-section of the exemplary fabric 12 shown in FIG. 1B taken along line AA, the dome type 60 resilient prominences 14 have an interior volume 44 that is void of material. The interior volume as shown in void and the resilient prominences are hollow. However, the interior volume may comprise a fill material or may comprise a fluid, such as a gas, or a phase change material or insulation. The apex 40 and troughs 42 are more clearly shown in this cross sectional view. The apex 40 is the portion of the resilient prominence that extends the furthest away from the troughs in a direction perpendicular from the fabric plane. An apex may be a point, a line, or a planar surface, as shown and described herein. The fabric plane 24, or plane that intersects the troughs of the resilient prominences, is shown in FIG. 1C. In addition, the first surface layer 22 is shown attached to a second surface layer 32 in FIG. 1C. The diameter 62 of the dome type resilient prominence is shown in FIG. 1C.

As shown in FIG. 1D, a cross-section of the exemplary fabric 12 shown in FIG. 1A-C, several of the resilient prominences are deformed 52. A resilient prominence may be depressed or deformed but can substantially return to its original, pre-depressed shape. A resilient prominence may comprise an elastomeric material that provides effective forces to automatically reshape a depressed resilient prominence back into its original shape.

As shown in FIG. 2A, an exemplary dome shaped 61 resilient prominence 14 has four sides and a flat or planar type apex 41. A dome shaped resilient prominence has surfaces that extend from a larger area base to an apex.

As shown in FIG. 2B, the exemplary fabric 12 comprises discrete type 46 resident prominences 14 having the general shape of that shown in FIG. 2A and a fill material 45 configured in the interior volume 44 of the resilient prominence. A fill material may be configured inside of the interior volume of resilient prominence, and may contribute to the resilient prominence regaining its original shape. The first surface layer 22 comprises apertures 50 configured uniformly over the surface of the resilient prominences. Another first surface layer 22' is configured in the fabric plane and extends under the resilient prominences. A second surface layer 32 is attached to this first surface layer 22'. The first surface layer 22', that extends under the resilient prominences, also comprises apertures 50' and these apertures may be configured in any suitable manner, such as over the entire fabric, as shown in FIG. 2B, or in discrete or specific locations, such as only under the resilient prominences. A first surface layer has a surface that is exposed at least partially on a first side of the fabric.

As shown in FIG. 3, an exemplary fabric 12 comprises resilient prominences 14 with apertures 50 configured in the apex 40. The apertures may be configured in any suitable location, such as in the apex, or trough. Apertures may be configured in the apex to promote or enhance moisture management, whereby more airflow from the second surface 30 to the first surface 20 may be achieved with specifically engineered and placed apertures. With apertures configured in the apex, wind flow 100 over the first surface 20 may draw airflow from the apertures 50.

As shown in FIG. 4, an exemplary fabric 12 comprises resilient prominences 14 with apertures 50 configured in the troughs 42. Again, the specific placement of the apertures may be engineered for any number of purposes, including airflow through the fabric, reflective performance, thermal insulation properties, and the like. In addition, the fabric or film in 40 and 42 can be made of material which is engineered to allow moisture vapor to pass through from one side to the next. The resilient prominences shown in FIG. 4 are a continuous type 48, whereby the perimeter of one resilient prominence intersects with or overlaps with another. Put another way, there is no flat space between one resilient prominence and another. A fabric as described herein may have any combination and configuration of resilient prominences including both discrete and continuous configured in a single fabric. In addition, apertures may be configured in any suitable location, such as only in the apex or only in the troughs, randomly or uniformly across the fabric or on a resilient prominence, and any combination thereof.

As shown in FIG. 5, the exemplary fabric 12 shown in FIG. 2B, comprises discrete type 46 resilient prominences 14. The troughs 42 outline a square shape and are defined by the perimeter 74 of the resilient prominences.

As shown in FIG. 6, an exemplary fabric 12 comprises resilient prominences 14 with apertures 50 configured in the apices 40 of the resilient prominences. The resilient prominences shown in FIG. 6 are funnel shaped and have a circular trough shape around the perimeter of the resilient prominences. The plane of the fabric 24 is also shown in FIG. 6.

As shown in FIG. 7, an exemplary fabric 12 comprises a plurality of dome type 60 resilient prominences 14 configured randomly over the fabric surface.

As shown in FIG. 8, an exemplary fabric 12 comprising a plurality of dome type 60 resilient prominences 14 configured uniformly aver the fabric surface having an aperture 50 configured in each of the apices 40.

As shown in FIG. 9, an exemplary fabric 12 comprises plurality of dome type 60 resilient prominences 14 having randomly configured apertures 50 as indicated by the small white dots on the resilient prominences. The apertures shown in FIG. 9 are small and configured randomly over the resilient prominences surface only, and not in the trough area, or plane of the fabric, where the fabric extends between the resilient prominences. A fabric used in the construction of the inventive fabric described herein may be air permeable and comprise a plurality of apertures or voids therethrough. Any suitable type of material may be used in the construction of the fabric, including woven, non-woven, mesh, screen, knits, polymeric membranes, polymeric films, batts of fibrous material, aerogel fabric, metallic films, elastomeric films and the like. Any other suitable materials may be used with the fabric, such as insulation materials between a first and second surface of the fabric including, fibrous materials, down, aerogel, microspheres, and other materials.

As shown in FIG. 10, an exemplary fabric 12 comprises a plurality of elongated resilient prominences 66 having apertures 50 configured along the apices 40 of the resilient prominences 14. The elongated resilient prominences 66 shown in FIG. 10 are linear types 65, whereby the apices extend linearly. In addition, elongated troughs 70 are configured between the continuous resilient prominences 48. It is to be understood that an elongated prominence may have curvature, whereby the apices extend non-linearly and comprise at least one curved portion, whereby the curved portion may be configured in a serpentine shape, sinusoidal shape, or in a spiral configuration, for example.

As shown in FIG. 11, an exemplary fabric 12 comprises a plurality of discrete 46 elongated resilient prominences 66 attached to a second surface layer 32. The apertures 50 of the linear type resilient prominences are configured along the apices 40. There is a gap distance G, between the discrete elongated resilient prominences 66 shown in FIG. 11. This distance between the troughs of two adjacent resilient prominences may be any suitable distance including, but not limited to, more than about 5 mm, more than about 1 cm, more than about 2 cm, more than about 5 cm, more than about 10 cm, and any range between and including the distances provided.

As shown in FIG. 2, an exemplary fabric 12 comprises a plurality of elongated resilient prominences 66 on the first surface 20 and on the second surface 30 of the fabric. The discrete type resilient prominences 46 on the first surface 20 are configured between the elongated troughs 70, or in the gap distance, G, of the elongated type resilient prominence 66 on the second surface 30. This alternating configuration of elongated resilient prominences from a first to second surface may provide for better thermal insulation. The resilient prominences on one of the surfaces of the fabric may be configured without apertures.

As shown in FIG. 13, an exemplary fabric 12 comprises a plurality of elongated resilient prominences 66 on the first surface 20 and the second surface 36 of the fabric, and an interior layer 36 configured there between. The linear type 65 elongated resilient prominences 66 are configured in an aligned orientation, whereby the resilient prominences on a first surface are aligned with the resilient prominences on a second surface. The elongated resilient prominence 66 shown in FIG. 13 are discrete, however continuous type elongated resilient prominence on the first and second surfaces could also be configured in an aligned orientation. The interior layer may be any suitable type of material or combination of materials and may be a permeable fabric as described herein, an aperture material with apertures configured randomly or in specific location, a reflective material and the like.

As shown in FIG. 14, an exemplary fabric 12 comprises a plurality of elongated resilient prominences 66 configured out of a permeable fabric 54. No apertures are configured in the permeable fabric, rather the fabric comprises a plurality of pores or apertures in the fabric itself.

As shown in FIG. 15, an exemplary fabric 12 comprises a plurality of elongate resilient prominences 66 configured out of a permeable material 54 having apertures configured along the apices 50. The permeable fabric 54 in this exemplary embodiment may have relatively low air permeability, with a gurley time of more than about 20 gurley seconds, whereby apertures configured therein may increase the air permeability. Gurley time, as measured in seconds, is measured using a Gurley Densometer model 4340, available from Gurley Precision Instruments, Troy, N.Y.

As shown in FIG. 16, an exemplary fabric 12 comprises a plurality of resilient prominences 14 having reflective material 90 configured thereon. The reflective material is configured randomly over the surfaces of the discrete resilient prominences. Some of the resilient prominences have reflective material on the planar type 41 apices 40, whereas other resilient prominences have reflective material configured on the ascending portions of the resilient prominences between the trough and the planar apices. A random configuration of the reflective material on the surface of the fabric, including the resilient prominences may be well suited for camouflage. The reflective material may be specifically selected to reflect IR energy and a reflect surface may include a material that is reflective of a desired wavelength. Likewise, an IR energy absorbing material may be configured on the surface in lieu of the reflective material or in combination with the reflective material. Some surface areas may comprise reflective material and other areas may comprise absorptive materials.

As shown in FIG. 17, an exemplary fabric comprises a plurality of dome type resilient prominences 60 having reflective material 90 configured on the inside surface 69 of the resilient prominences. The reflective material may be configured to reflect thermal energy back to the wearer of the garment, for example. The shape of the resilient prominences may be selected to concentrate the reflective energy back towards the user. As shown in FIG. 17, an interior layer 36 comprises reflective material 90' as well. This reflective material may be a coating on a first surface layer 22 or second surface layer 32 and may be configured across the entire fabric layer or in discrete location, such as between the resilient prominences, or in the gap areas only. A concentrator material 92 is configured such that reflective energy from the interior surface 69 of the resilient prominences 14 may be absorbed and concentrated. A concentrator material may comprise materials that absorb thermal energy, such as thermally conductive materials, coating, or fillers or phase change materials.

As shown in FIG. 18A, an exemplary pyramidal shaped 67 resilient prominence 14 has three ascending planar surfaces 47 extend to a point type apex 43. FIG. 18B shows a top down view of the pyramidal shaped 67 resilient prominence shown in FIG. 18A. A pyramidal shaped resilient prominence may be uniform, whereby all of the ascending planar surfaces are the same size, or one or more ascending planar surfaces may be different in size than the others.

As shown in FIG. 19A, an exemplary resilient prominence 14 is a tear drop shaped resilient prominence 64, whereby one end of a generally dome shaped resilient prominence is more narrower than an opposing end. FIG. 19B shows a cross-sectional view of the resilient prominence shown in FIG. 19A taken along line ZZ. The interior volume of the resilient prominence is non-uniform along the length of the resilient prominence taken along line ZZ.

The resilient prominences shown in FIGS. 1 through 19 are all examples of shaped resilient prominences 78. A fabric as described herein may comprise shaped resilient prominences on at least one surface, whereby a plurality of geometrically shaped resilient prominences are configured on at least one surface. For example, a fabric may comprise a plurality of shaped resilient prominences, or a plurality of linear type, dome type, dome shaped, pyramidal shaped, or any combination thereof on at least one surface. A first side of a fabric may comprise a first type of resilient prominences and a second side may comprise a second type of resilient prominences. In addition, a first portion of a fabric may comprise a first type of resilient prominences and a second portion of a fabric may comprise a second type of resilient prominences. For example, a fabric configured into a coat may comprise dome shaped resilient prominences on chest and back portion of the coat on the outer surface and linear type dome shaped resilient prominences around the sleeves of the coat. A specific type of resilient prominence may be chosen to provide better flex or bending of a fabric, such as around the elbow, shoulder or knees of a garment construction.

As shown in FIG. 20, an exemplary garment 80, a jacket 82, comprises the fabric 12 as described herein. The outer surface of the jacket 82 comprises a fabric having discrete resilient prominences 14, as described herein.

As shown in FIG. 21, an exemplary cover 84 is draped over a tank. The fabric 12 comprises resilient prominences and a reflective material 90 on the outer surface of the cover. One portion of the fabric may comprise random type resilient prominences and another portion of the fabric may comprise a specifically shaped type resilient prominence including, but not limited to, dome type, dome shaped, linear type, pyramid shaped, triangular shaped and the like. A shaped resilient prominence has a regular geometric shape that is repeated a plurality of times on at least one surface of the fabric, whereas a random type resilient prominence has no particular regular geometric shape that is repeated on a surface.

As shown in FIGS. 22 and 23 an exemplary fabric 12 comprises random type 76 resilient prominences on a first surface draped over a tank. The random resilient prominences are randomly configured over the surface of the fabric and comprise no repeating pattern or specific shape or shape type as described herein. One portion of the fabric may comprise random type resilient prominences and another portion of the fabric may comprise a specifically shaped type resilient prominence including, but not limited to dome type, dome shaped, linear type, pyramid shaped, triangular shaped and the like. A shaped resilient prominence has a regular geometric shape that is repeated a plurality of times on at least one surface of the fabric, whereas a random type resilient prominence has no particular regular geometric shape that is repeated on a surface.

Figure 24A:
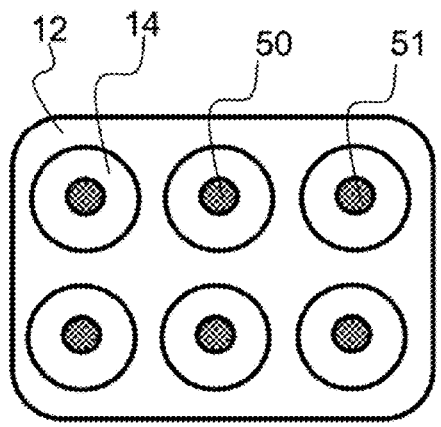

FIG. 24A shows a fabric 12, having hole type apertures 50 configured at the apex of resilient prominences 14. A hole type aperture has a portion of the outer fabric layer removed and, as shown, a circle is cut away from the fabric outer layer. Any suitable cut-away shape may be used however including a circle, oval, square, polygon, and irregular shapes.)

Figure 24B:
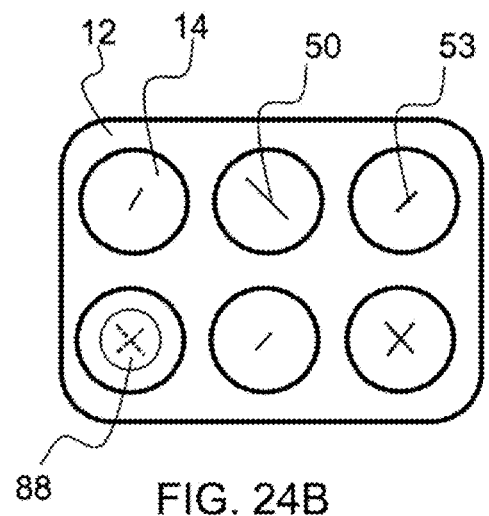

FIG. 24B shows a fabric 12, having slit type apertures 53 configured at the apex of resilient prominences 14. The slit type apertures are configured in different orientations and have different lengths. The slit type aperture in the bottom right corner comprises two slits that intersect to form a cross type slit. A flap valve 88 is configured over a cross type slit in the bottom left-hand corner. The valve may substantially prevent air from entering the resilient prominence but allow air to pass from the resilient prominence to the outside. A valve 88, or aperture cover may be attached in one location, to allow the valve to flap open, or in a plurality of location to create a pocket between the flap valve and the aperture in the resilient prominence fabric.

Figure 24C:
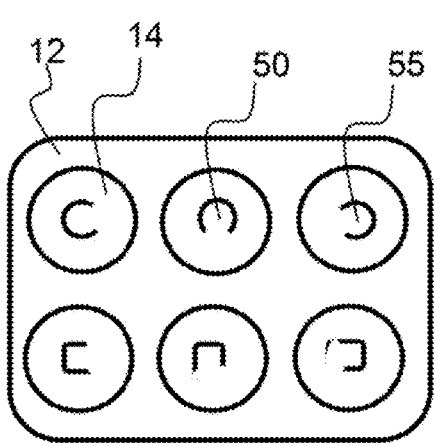
Figure 24D:
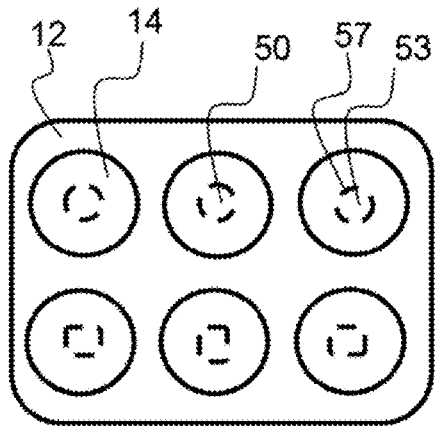

FIG. 24C shows a fabric 12, having tab type apertures 55 configured at the apex of resilient prominences 14. A tab type aperture comprises a slit that extends around a shape, such as a circle in the top row and a square in the bottom row, as shown in FIG. 24C. The portion of the shape not slit, ties the tab to the fabric but allow the tap to open. The tab type apertures 55 are configured in different orientations, or the retaining portion of the tab is configured such that the tabs can open in different directions.

FIG. 24C show a fabric 12, having slit type apertures 53 configured at the apex of resilient prominences 14. The slit type apertures shown in FIG. 22D outline a shape with discontinuous slits, or are shape type slit apertures 57. The shape type slit apertures in the top row comprise discontinuous slits that outline a circle and the shape type apertures in the bottom row comprise discontinuous slits that outline a rectangle. Any combination of aperture types may be used or combined on one or more fabric surfaces.

As shown in FIG. 25A, a cyclist is wearing a standard garment and a wide wake is produced. The flow separation is proximate the leading edge of the cyclist creating a wide wake, as indicated by the flow lines around the cyclist. This wide wake creates substantial drag on the cyclist and reduces performance. A cyclist will have to produce a higher output to overcome this drag from the air flow.

As shown in FIG. 25B, a cyclist is wearing a garment having resilient prominences configured thereon, as described herein, and a more narrow wake is produced. The flow separation is further along the cyclist or closer to the trailing edge of the cyclist. This extended contact of flow over the resilient prominence fabric, or later flow separation, creates a more narrow wake and less drag. The cyclist will therefore go faster than a cyclist wearing a standard garment as shown in FIG. 25A.

As shown in FIG. 26A, a skier is wearing a standard garment and a wide wake is produced. Separation of flow is proximate the leading edge of the skier as indicated by the flow lines around the skier.

As shown in FIG. 26B, a skier is wearing a garment having resilient prominences configured thereon, as described herein, and a more narrow wake is produced. The flow separation is further along the skier or closer to the trailing edge of the skier. This extended contact of flow over the resilient prominence fabric, or later flow separation, creates a more narrow wake and less drag. The skier will therefore go faster than a skier wearing a standard garment, as shown in FIG. 24A.

The skier and the cyclist shown in FIG. 25 and FIG. 26 are examples of self-propelled applications for a resilient prominence garment. A resilient prominence garment may be particularly well suited for self-propelled competitive activities where higher speeds with less output is desirable. Resilient prominence fabric can also be applied to rigid structures like helmets or boots and/or semi-rigid structures like running shoes, knee pads, and other items to deliver drag reduction and performance enhancing benefits.

As shown in FIG. 27, a sail boat has wind incident on the sail. It is generally understood that no more than about 60% of the wind's energy can be transferred to a sail, known as the Betz limit. The air provides energy to the sail and reduces in speed. Enough energy must remain in the wind to carry it from the sail after imparting energy to the sail. FIG. 27 shows some of the parameters that are well known in the physics of sailing.

FIG. 28 shows an isometric view of an exemplary air foil 110, or sail 111 having resilient prominences on a portion of the sail. The resilient prominences 14 are configured aft of the center of lift 112 section of the sail, as indicated by the dashed line. The resilient prominences reduce drag as the wind passes over the trailing portion of the sail. It is to be understood that the resilient prominences may be configured along any suitable portion of the sail, or the entire sail, and may be configured on one or both sides of the sail.

Any combination of fabric features as described herein, including resilient prominence type and or shape, apertures configured therethrough, fabric layers, reflective material, fill material and the like may be combined in any suitable way for the application of the fabric.

Example 1: Fabric with Resilient Prominences

A fabric comprising a plurality of resilient prominences was made by vacuum molding a 2-layer laminate to form a fabric with hexagonal dimples. The first step involved laminating a 5 mil thick breathable film from Griff Paper and Film, Fallsington, Pa., to a resilient fabric, RXPN-FDT3288 Nylon and Spandex 6.0× full dull tricot, from Designer Alley, Medford, Oreg., using a light layer of spray adhesive Super 77 Adhesive, from 3M Company, St. Paul, Minn. In the second step, the laminate was positioned over the mold. In the third step, this laminate was molded using the combination of heat, pressure and time needed to deform the laminate into the mold with clear definition from the mold and a height of approximately 0.1875 inch and center to center about 1 inch. The mold was made from aluminum, 0.25 in. thick and machined using CNC methods to create a regular pattern of hexagonal shaped cells. The hexagonal cells were machined through the aluminum such that low pressure on one side could be used to draw the laminate into each cavity. The low pressure was created using a high volume blower connected with tubing to a cavity that was enclosed on all sides except the side containing the mold. Heat for the molding process was provided by an array of infra-red lamps. In this particular example, the infra-red lamp array spanned the full 60 inch width of the mold. The laminate received adequate heating for proper deformation when the lamp array was 2 inches from the fabric and moved at a rate of 1.0 inch per second. The mold was 30 inches long, so once a section of fabric was molded that was as long as the mold, the fabric was removed from the mold and repositioned so as to make another section by repeating the steps described above.

The fabric produced had a plurality of hexagonal shaped resilient prominences as general described by FIGS. 1A through 1C. The diameter of the resilient prominences was approximately 0.875 inches and they prominences were spaced approximately 1.0 inch center to center and had a height of approximately 0.1875 inch.

Example 2: Fabric with Randomly Oriented Resilient Prominences

A fabric comprising a random array of resilient prominences was made by stitching elastic in an aluminized Tyvek film such that the elastic caused the Tyvek to pucker irregularly. The Tyvek film (Material Concepts, Tyvek 1443R) was aluminized on both sides by VDI LLC (Louisville Ky.). Later straight lines of stitching were sewn into the Tyvek on 6 inch centers. A similar pattern was sewn into the Tyvek at a 90 degree angle to the first set of lines of stitching. The stitching was made using a standard sewing machine modified to use elastic thread on the bottom (bobbin side) of the fabric as it was fed through the sewing machine. The pattern of stitching caused the Tyvek to pucker and the puckers formed the resilient prominences.

Thermal Testing

The thermal resistance of a fabric as described in Example 1, was measured using an International Thermal Instruments Company, Inc., heat flux transducer (Model AHT 12). The transducer consisted of a thermopile that generated a direct current voltage signal that was proportional to the heat flowing through the thickness of the transducer. To measure thermal resistance, the test specimen was placed on top of the transducer, and a temperature difference was maintained through the transducer and test specimen. A silicone rubber heating blanket, available from Brisk Heat Inc., model SRP 12121, powered by a regulated power supply was used to maintain the temperature difference. Since the transducer was relatively thin (0.120 in.) and had high thermal conductance, the signal was inversely proportional to the thermal resistance of the sample on top of the transducer. Inaccuracies due to lateral gains and losses beyond the test area were minimized by using a heated guard ring, and 24×24 in. samples that overlapped the test and the heated guard ring. To eliminate inaccuracies caused by air currents in the test area, an enclosure was used that created an enclosed air space 18 inches above the test specimen and the guard ring.

This test was used to compare the thermal resistance of various fabrics that may be usable as the outer layer or covering of a cold weather garment. When optimizing a cold weather garment, it is important to know the thermal resistance of each layer that goes into the garment. In the table below, the thermal resistance is shown for 3 materials. The first is a very lightweight rip-stop Nylon useful in sleeping bags and garments. The other two fabrics are examples of resilient prominence fabric per the descriptions above. As the data shows the resilient prominences improve the thermal resistance of the fabric by 30 to 67%.

TABLE 1

Signal from transduce divided by the delta T across the plates
Comparison Of Thermal Resistance of Fabrics

|  | Average Calculated Insulation Factor mVDC/(dT plates) | % improvement over ripstop nylon |
|---|---|---|
| 1.7 oz/yd^2 ripstop Nylon | 0.61 |  |
| Example 1 hexagonal resilient prominece fabric | 0.43 | 30% |
| Example 2 random resilient prominence fabric | 0.2 | 67% |

In a second test using the same measurement technique, the thermal resistance of two fabric/insulation combinations were compared. When optimizing an insulated cold weather garment, it is important to know the thermal resistance of combinations of materials that make up the garment. In the table below, the thermal resistance is shown for two combinations. The first is a very lightweight rip-stop Nylon combined with a polyester batt insulation. The second combination is the same rip-stop Nylon fabric combined with the resilient prominence fabric of Example #2. As the data shows the resilient prominence combination is 33% more effective as an insulation. To compare the efficiency of the combinations on an equal weight basis, the comparison factor is multiplied by the areal weight. Even though the Example #2 fabric is heavier than the batting, it is substantially more efficient having a 20% greater weight efficiency or insulation factor normalized for areal weight.

TABLE 2

Comparison Of Thermal Resistance of Clothing Fabric Insultation Combinations

| | | Average Calculated Insulation Factor mVDC/ (dT plates) | % improvement | Areal Weight oz/yd 2 | % Improvement |
|---|---|---|---|---|---|
| | Polyest batt and 1.7 oz/yd 2 ripstop Nylon | 0.61 | | 0.94 | |
| Example 2 | random resilient prominence fabric with 1.7 oz/yd 2 ripstop nylon | 0.2 | 33% | 0.74 | 20% |

Wind Tunnel

A bicycling style jacket made with a fabric as described in Example 1 on approximately 70% or the outer surface was made and tested in a wind tunnel. A comparative jacket made with the same fabric but with no resilient prominences was made and tested as a comparative jacket. Each jacket was tested on a bicycle rider, on a mounted bicycle, in the wind, tunnel. Wind resistance data was also gathered for the rider and bicycle with no jacket at ail. Tests were conducted in the low speed wind tunnel and aerodynamic research facility of Faster Inc., in Scottsdale, Ariz.

While it was found that both jackets added to the wind drag experienced by the rider/bicycle combination, the jacket with resilient prominences added less drag than the comparative jacket. With a simulated headwind of approximately 30 MPH, the rider/bicycle combination provided drag equivalent to 4950 grams. Using the jacket made with the resilient prominence fabric, the total drag was 5253 grams under similar conditions. The comparative jacket provided 5507 grams of drag. Therefore the resilient prominence fabric added 46% less additional drag than the comparative fabric.

TABLE 3

Comparison of Air Drag of Bicycle Jackets

| | No Jacket | Standard Jacket | Resilient Prominence Jacket |
|---|---|---|---|
| Wind Drag at 30 MPH, grams | 4,950 | 5,507 | 5,253 |
| Added by Jacket, grams | | 557 | 303 |

Car-Top Wind Resistance Tests

Wind drag was compared for a fabric having resilient prominences, as generally described in Example 1, and a comparative fabric comprising the same materials but with no resilient prominences. Each fabric was mounted to a flat surface on top of a car as generally show in FIG. 31. The flat surface was positioned at an angled of approximately 30 degrees relative to the ground, with the lower edge of the surface toward the front of the car, such that the forward motion of the car would force wind over the surface. The flat surface was configured on slides that allowed it to move freely on an axis parallel to the forward direction of travel of the auto. A spring scale with a digital readout was used to resist the motion of the flat, angled surface. The readout was positioned so that it could be read through the closed skylight by a passenger in the back seat. The flat surface, where the fabrics were mounted was approximately 4 feet wide across the car, and 2 feet high, projecting at an upward angle or approximately 30 degrees. The fabric samples were approximately the same size. With a fabric mounted to the flat and angled surface, the greater the wind force against the surface, the greater the force registered on the spring scale. The vehicle speed was maintained at approximately the same speed, 35, MPH, for each test of the fabrics, while recording force measurements on the flat surface. The average force measured for the resilient prominence fabric with the vehicle moving at 35 mph was 100 ounces, and 143 for the comparative fabric. Assuming that the air density, headwind and crosswinds were comparable for the two fabric samples, the resilient prominence fabric showed a clear reduction is wind drag when moving at 35 mph. Put another way, the resilient prominence fabric provided 30% less drag that a comparative fabric without resilient prominences.

Infrared Camouflaging Evaluation

A test was conducted to determine if the resilient prominences could be used to alter the infrared signature of the fabric. Since skin temperature is approximately 92 F, an infrared camera detecting temperatures between 92 F and ambient temperatures may be viewing a human form. If the shape has the shape of a human silhouette, it is even more likely to be a human. While there are many ways of defeating an infrared camera, the present invention offers a low cost, passive means of confusing the IR camera operator.

In this test, the fabric of Example #1 was placed on a heated plate and viewed through an IR camera from Fluke. The fabric did not present a solid form or silhouette. As shown in FIG. 29, the fabric 12, having the resilient prominences 24, did not have a consistent thermal image. The network of webs connecting the hexagonal prominences were significantly more visible. This confirms that a pattern could be used in the fabric that camouflages the wearer in the view of an IR camera. A camouflage patter of resilient prominences and/or network therebetween could be utilized to mask the signature of a person or object when viewed through a thermal camera. As shown in FIG. 30, a person is donning a jacket comprising resilient prominence fabric. Again, the resilient prominences are darker than the network therebetween. This demonstrates increased thermal insulation of the prominences over the network material. The shape of the prominences may also be providing a reflective benefit, whereby a flat surface, such as the network of material between the prominences, has a brighter IR signature than a surface that is curves, such as the resilient prominences. This type of garment would better protect soldiers from view of an enemy.

It will be apparent to those skilled in the art that various modifications, combinations and variations can be made in the present invention without departing from the spirit or scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A fabric comprising:
   a) a first surface comprising:
      i) a first surface fabric layer
      ii) a plurality of resilient prominences that extend outward from the first surface and having;
         an original shape;
         an interior volume;
         an inside surface; and
         a reflective material on said inside surface of the plurality of resilient prominences;
      wherein thermal energy is reflected from the reflective material back toward the interior volume of the plurality of resilient prominences,
   b) a fill material within the interior volume of the plurality of resilient prominences;
   c) a second surface on an opposing side of said fabric from said first surface and comprising:
      i) a second surface fabric layer;
      wherein said fabric is air permeable from said second surface to said first surface;
      wherein the first surface fabric layer comprising a plurality of apertures; and
      wherein the first surface fabric layer and second surface fabric layer are a different material from the fill material.

2. The fabric of claim 1, wherein the plurality of apertures are no larger than 0.3 mm in diameter.

3. The fabric of claim 1, wherein the plurality of resilient prominences have a height of no more than 19 mm.

4. The fabric of claim 3, wherein the plurality of resilient prominences are dome shaped and have a diameter of no more than 2.0 inches.

5. The fabric of claim 1, wherein the reflective material is a vapor deposited metal.

6. The fabric of claim 1, wherein the plurality of apertures comprise a tab type apertures.

7. The fabric of claim 1, wherein the fill material is an elastomeric material.

8. The fabric of claim 1, wherein the plurality of apertures are substantially uniformly configured in the fabric layer.

9. The fabric of claim 1, wherein the plurality of apertures comprise apertures configured in the resilient prominences.

10. The fabric of claim 1, wherein the fill material is an elastomeric foam.

11. The fabric of claim 1, wherein the fabric layer comprises at least 5 apertures per square inch.

12. The fabric of claim 1, wherein the first surface fabric layer comprises two layers, and
    wherein one of the two layers is a polymeric film layer having apertures and the other of the two layers is a non-woven fabric layer.

13. The fabric of claim 1, wherein the first surface fabric layer comprises two layers, and
    wherein one of the two layers is a polymeric film layer having apertures and the other of the two layers is a woven fabric layer.

14. The fabric of claim 1, further comprising a plurality of resilient prominences on the second surface of said fabric that are offset from said plurality of resilient prominences on said first surface to create an alternating configuration from the first surface to the second surface.

15. The fabric of claim 1, wherein the plurality of resilient prominences are elongated resilient prominences each having an apex that extends linearly along a length of the elongated resilient prominences.

16. The fabric of claim 15, further comprising a plurality of elongated resilient prominences on the second surface of said fabric that are offset from said plurality of elongated resilient prominences on said first surface to create an alternating configuration from the first surface to the second surface.

17. The fabric of claim 1, wherein the reflective material is configured on an inside surface of the first surface fabric layer and on an outside surface of an interior layer; wherein the plurality of resilient prominences have a reflective material on opposing surfaces.

18. The fabric of claim 1, wherein the fill material is a concentrator material that absorb thermal energy reflected back into the resilient prominence from the reflective material.

19. A garment comprising the fabric of claim 1.

20. The garment of claim 19, wherein the garment is selected from the group consisting of pants, shirts, jackets, ski suits, sailing apparel, hang-gliding apparel, motorcycle apparel, snowmobile apparel, survival gear, and protective apparel.

* * * * *